(12) United States Patent
Tokuda

(10) Patent No.: US 10,507,586 B2
(45) Date of Patent: Dec. 17, 2019

(54) MOTOR MODULE SYSTEM

(71) Applicant: Keigan Inc., Kyoto (JP)

(72) Inventor: Takashi Tokuda, Kyoto (JP)

(73) Assignee: Keigan Inc., Kyoto (JP)

( * ) Notice: Subject to any disclaimer, the term of this patent is extended or adjusted under 35 U.S.C. 154(b) by 0 days.

(21) Appl. No.: 16/074,302

(22) PCT Filed: Jan. 30, 2017

(86) PCT No.: PCT/JP2017/003114
§ 371 (c)(1),
(2) Date: Jul. 31, 2018

(87) PCT Pub. No.: WO2017/131225
PCT Pub. Date: Aug. 3, 2017

(65) Prior Publication Data
US 2019/0337159 A1    Nov. 7, 2019

(30) Foreign Application Priority Data
Jan. 31, 2016   (JP) .............................. 2016-016786

(51) Int. Cl.
*G05B 19/18* (2006.01)
*B25J 13/00* (2006.01)
(Continued)

(52) U.S. Cl.
CPC ............. *B25J 13/006* (2013.01); *B25J 13/08* (2013.01); *B25J 5/007* (2013.01); *B25J 9/0084* (2013.01);
(Continued)

(58) Field of Classification Search
CPC combination set(s) only.
See application file for complete search history.

(56) References Cited

U.S. PATENT DOCUMENTS

| 2010/0292836 A1 | 11/2010 | Cheung et al. |
| 2013/0131864 A1 | 5/2013 | Jody et al. |

(Continued)

FOREIGN PATENT DOCUMENTS

| JP | H08-19985 A | 1/1996 |
| JP | 2003-001577 A | 1/2003 |

(Continued)

OTHER PUBLICATIONS

Extended European Search Report issued in corresponding European Patent Application No. 17744454.4, dated Jan. 7, 2019 (9 pages).

(Continued)

*Primary Examiner* — Bhavesh V Amin
(74) *Attorney, Agent, or Firm* — Osha Liang LLP

(57) ABSTRACT

A motor module system has a plurality of identical modules, a robot configured by connecting said plurality of motor modules directly or via connecting members, and a setting terminal. Each motor module includes a motor main body having a rotating output portion, a wireless communication function, a control unit, and a battery. The wireless communication function, the control unit, and the motor main body are in a same housing. The setting terminal has a wireless communication function and a setting function for assigning functions to the control unit of each of the plurality of motor modules using the wireless communication function in order to operate said robot. The control unit controls the driving of the motor main body based on the function set by the setting function of the setting terminal.

9 Claims, 13 Drawing Sheets

(51) Int. Cl.
- *B25J 13/08* (2006.01)
- *B25J 9/08* (2006.01)
- *B25J 9/16* (2006.01)
- *B25J 5/00* (2006.01)
- *B25J 9/12* (2006.01)
- *B25J 9/00* (2006.01)

(52) U.S. Cl.
CPC .................. *B25J 9/08* (2013.01); *B25J 9/126* (2013.01); *B25J 9/1656* (2013.01)

(56) References Cited

U.S. PATENT DOCUMENTS

| | | |
|---|---|---|
| 2015/0094879 A1 | 4/2015 | Pari et al. |
| 2015/0321348 A1 | 11/2015 | Rollinson et al. |

FOREIGN PATENT DOCUMENTS

| | | |
|---|---|---|
| JP | 2006-123158 A | 5/2006 |
| JP | 2006-297531 A | 11/2006 |
| JP | 2012-056001 A | 3/2012 |
| JP | 2015-220601 A | 12/2015 |
| JP | 2016-007648 A | 1/2016 |

OTHER PUBLICATIONS

Kanako Harada et al.: "Wireless reconfigurable modules for robotic endoluminal surgery", 2013 IEEE International Conference on Robotics and Automation (ICRA); May 6-10, 2013; Karlsruhe, Germany, Jan. 1, 2009 (Jan. 1, 2009), pp. 2699-2704, XP055392562, US ISSN: 1050-4729, DOI: 10.1109/Robot.2009.5152636 ISBN: 978-1-4673-5641-1 (6 pages).

H. Kurokawa et al.: "Distributed Self-Reconfiguration of M-TRAN III Modular Robotic System", International Journal of Robotics Research., vol. 27, No. 3-4, Mar. 1, 2008 (Mar. 1, 2008), pp. 373-386, XP055301450, US ISSN: 0278-3649, DOI: 10.1177/0278364907085560 (14 pages).

International Search Report issued in PCT/JP2017/003114 dated Apr. 11, 2017 (4 pages).

Written Opinion of the International Searching Authority issued in PCT/JP2017/003114 dated Apr. 11, 2017 (6 pages).

Notification of Reasons for Refusal issued in JP Patent Application No. 2016-016786, dated Nov. 30, 2016 (11 pages).

(a)

(b)

(c)

(a)

(b)

(c)

(d)

MOTOR MODULE SYSTEM

TECHNICAL FIELD

The present invention relates to a motor module system. This motor module system instantaneously creates for example, robots having various functions.

BACKGROUND ART

In recent years, in addition to industrial robots, various service robots have been developed, and prototype development of these are thriving. Various kinds of service robots have been proposed such as that of Patent Document 1.

[Patent Document 1] Japanese Laid-open Patent Publication 2006-297531

DISCLOSURE OF INVENTION

Problem to be Solved by Invention

However, when prototyping and developing a robot that exhibits a predetermined function, huge developmental costs has been required. In particular the development costs of humanoid robots is said to be hundreds of millions if not billions of yen. Specifically, when developing a robot for performing a specific operation, because motors suitable for application as the motive power for the moving parts must be selected, it is necessary to "individually" design the motor, by selecting the machine design such as the mounting parts, the electrical circuit design of the motor driver parts, the power supply design, the housing design and the wiring.

Furthermore, in order to control position and speed while efficiently saving energy for the motor (especially for the brushless motor), particularly high level knowledge has been required. As a result, developmental costs and the development period is lengthy and hinders research into robots and commercialization. Meanwhile, there had been no means for people without expert knowledge to make robots themselves.

Means to Solve the Problem

In order to solve the above problem, present invention includes, (1) a plurality of identical motor modules, a robot configured by connecting said plurality of motor modules either directly or via connecting members, and a setting terminal. Each motor module includes a motor main body having a rotating output unit, a wireless communication function, a control unit, and a battery. The setting terminal includes a wireless communication function and a setting function which assigns functions to the control unit of each of the plurality of motor modules uses wireless communication so that the robot is able to operate, and the control unit is configured so as to control the driving of the motor main body based on the functions set by the setting function.

As an example, each motor module in this specification is implemented in the same housing (case) with at least a motor main body, a wireless communication function, a control unit for controlling the rotation of the motor main body, and the respective components of the power supply unit. Implementation is not limited to being built-in, but for example, may also include those to be attached to the outside of the housing. Being attached outside may mean, for example, that part or all of the constituent elements on the outer peripheral surface of the casing are in a state in which they are in contact with each other, or a part or all of the constituent elements are positioned on the outside of the casing and connected via connecting members such as cables. If connecting via connecting members, the connecting members may be detachable from the housing side or the constituent elements, or they may be fixed without being detachable. For example, if the battery constituting a part of the power supply unit is arranged outside the housing (case), replacement can easily be done.

In the embodiments, the connecting members correspond to mechanical elements. The setting terminal corresponds to the first terminal 11 in the embodiments. For the motor main body, a compact general-purpose motor such as a brushless DC motor, a stepping motor or the like is preferably used. The battery may be a fixed type but is preferably a detachable type. Both primary batteries and secondary batteries are applicable if the batteries are a detachable type. Because the motor modules sufficiently provide in addition to the motor body, at least a wireless communication function, a control unit, and a battery, they can be installed in a small housing (case). Therefore, in comparison with the dimensions of the motor main body, the motor modules can be realized compactly without becoming extremely large.

Since the motor modules are provided with a control unit for controlling the rotation of the motor main body, by assigning functions and appropriately changing the functions to be set in each control unit, the motor modules can demonstrate the functions of various robots. In addition, since each of the plurality of motor modules have the same configuration, a user can prepare ahead of time a number of motor modules and connecting members for connecting the motor modules, making it possible to quickly assemble the necessary robot based on the situation and make it operable by assigning settings and functions. Also, functions can easily be assigned by wireless communication.

(2) For configurable robots, a plurality of types of the functions are installed ahead of time on the setting terminal as those that can be set in the motor modules that will constitute the robot; each function corresponding with each motor module to be set is selected from the plurality of installed functions, and then the function(s) is assigned. Selecting the function to be set may be done manually by the user or may be automatically selected by the setting terminal.

In this way, even if a user does not have expert knowledge regarding robots, by selecting functions from among the prepared items, motor modules can easily be provided with functions by using wireless communication.

(3) The control unit of the motor module may control driving of the motor main body of the motor module based on the functions set by the setting terminal. As a result, even when there is no setting terminal, it can operate as a robot with only a motor module. Also, in the motor module system, a motor module that controls the driving of the motor main body of the motor module itself, and a motor module that controls the driving of the motor main body based on an external command may be intermingled.

(4) The rotation information based on the rotation of the motor main body is used as input information, and the rotation of the motor main body of the motor module itself or another motor module may be controlled based on the input information. The rotation information based on the rotation of the motor main body includes rotation information of the rotational output of the motor main body itself, as well as for example indirect information like the rotation information of the output of the deceleration mechanism unit when the deceleration mechanism unit is attached. Control of the rotation of the motor main body based on the input information is carried out either directly by the motor module or via a control terminal. According to the present invention, the motor modules can be used as input devices. Then, input and control are possible only with the motor modules.

(5) In the motor modules, the rotating output unit may have a flat surface. The flat surface is realized in the embodiments by the top panel $22g$ of the rotor. By making it a flat surface, it is possible to easily and stably attach connecting members and other elements to the output unit.

(6) The output unit may have an opening in the center of the flat surface. In the embodiments, the opening is realized by a hollow shaft $22e$. By providing an opening, then even if, for example, the other end connected to the output unit is rod shaped, it can still be stably installed.

(7) A detachable deceleration mechanism unit may be provided to the output unit. In this way, since adjusting the number of revolutions and the torque is possible, there are a variety of applicable robots.

(8) The motor module may further include a rotary encoder capable of detecting the rotation of the motor main body wherein the rotation of the rotor of the motor main body is detected by the rotary encoder based on external force, and may also provide a rotation information output function for outputting information on the detected rotation. Thus, for example, the control terminal can acquire the rotation information and use it for controlling the motor modules. Therefore, the motor modules can function as input devices and can make up a robot having a wider variety of functions. In addition, if the control unit of a motor module functions so as to control other motors, control to the motor modules based on the rotation information may be done via the control terminal or may be done directly by the motor modules.

(9) The motor module may have a response function that notifies whether the function received from the setting terminal has been assigned. The response function can either be some kind of temporary operation of the embodiment or can cause a light emitting element to emit light. That is, the operation includes dynamic operation (for example, rotation of the motor main body) and static operation (for example, light emission of the light emitting element). A user who is setting the function can then recognize which motor module was set with the current function by seeing the operation of the response function and is able quickly and appropriately set functions.

(10) The response function may be realized by rotating the motor body based on a notification from the setting terminal. In this way, as the motor body rotates, the connecting members or other motor modules connected thereto move, making it easy to determine which motor module is being set.

(11) The response function may be realized by a light emitting element that emits light based on a notification from the setting terminal. In this way, since the robot remains stationary, a stable posture is able to be maintained. In addition, since it consumes less power, it is preferable because it has less influence on battery consumption.

(12) The setting terminal has a notification function for sequentially notifying a plurality of motor modules to be set, and the setting terminal may assign to the notified motor module the function accepted while the target is being set. In this way, since the setting terminal automatically and sequentially switches the motor module to be set and makes selecting the setting target unnecessary, a user just confirms which motor module has been set, and because only the appropriate function needs to be specified, work efficiency for assigning functions is improved.

(13) The motor module may have an assignment request function for requesting the setting terminal that the function be set from the setting terminal. A user uses the assignment request function of the motor module to set the functions and notifies the setting terminal that the motor module has been set. Since the user operates the set motor module, it is possible to perform function assignment appropriately without making mistakes with the setting target.

(14) The assignment request function may be performed based on operation of a switch included in the motor module. In this way, it can be done by a simple process called switch operation.

(15) The assignment request function may be performed based on the rotational operation of the motor body with respect to the rotor. This is preferable because the assignment request function can be realized without providing separate special equipment.

(16) The setting terminal includes a determination function for determining a function to be set in each motor module in which the setting terminal is then able to assign the determined function, and a notification function for sequentially notifying that a function assigned to each of the plurality of motor modules has been set based on an operation performed by the motor module having received the notification.

Operations performed by the motor module include both static operations such as light emission and dynamic operations such as rotation of the motor body. Function assignment for some or all motor modules can then be performed automatically.

(17) The determination function may be performed based on image recognition processing results performed on an image obtained by imaging the robot.

(18) Further, sensors for detecting the state of movement of the robot may be provided, and the determination function may be performed based on output received from the sensors associated with the rotation operation; also, the operation is the rotational motion of the set motor module.

(19) The robot may include a smartphone, and the sensors may be those built into the smartphone. Sensors incorporated in the smartphone include, for example, an accelerometer and a gyro sensor. Because these sensors can accurately detect the orientation and position of the smartphone, by using such sensors and the sensors' output, the system can be realized without providing separate sensors.

(20) The motor module may include a light emitting unit emitting light of different colors, and the setting terminal may set functions in the control unit of the motor modules to be set by using the light emitting colors of the light emitting unit(s). The light emitting unit that emits lights of different colors may emit light in a plurality of colors through a single element such as a full color LED or instead may be capable of emitting a plurality of colors by preparing a plurality of monochromatic LEDs of different colors. Further, in a light-emitting element which emits different colors using one element, it is not limited to full color, and may be about 2 to 5 colors.

If each light emitting unit provided in a plurality of motor modules which constitutes the robot is controlled so as to emit lights of mutually different colors, it is possible to easily identify the motor module to which a function has been set based on the color of the light emitted. For example, specifying the motor module for the setting terminal may be automatically performed on the setting terminal side by using image recognition processing, or may be recognized by a user operating the setting terminal. For example, the setting terminal communicates with the surrounding motor modules to acquire specific information in order to specify with which motor module to communicate. Then, each control section emits light from the light emitting section with the designated emission color, and the setting terminal notifies the control unit of each motor module of the emission color by using the specific information. The setting terminal can determine and set the functions to be set in each motor module by recognizing which color is being emitted by the motor module and at which position of the robot the light is being emitted from though, for example, image recognition processing. Instead of specifying the emission color from the setting terminal side in this manner, the emission color is decided on the side of the motor module, the light emitting section is emitted with the determined color, and the self-determined color may be notified to the setting terminal. In this case, the same emitted color may be obtained from different motor modules; however, if such a situation occurs, it is preferable to communicate with the setting terminal and control so that the emitted colors are different.

Also, in the present invention, with the emitted color serving as the basis as described above, the function to be set is not limited to those performed by the setting terminal, but also a user may make recognitions by using the emitted color. For example, as described above, the setting terminal communicates with the control unit of each motor module, and the information specific to the motor module and the emission color are associated with each other. Then, for example, when displayed on the setting screen for setting functions, the control terminal provides a display so that each motor module can be recognized based on which color light is emitted. As a result, by checking the emission color of the actual motor module while looking at the setting screen, it is easy to understand which function should be assigned to each motor module.

(21) The setting terminal has a first storage unit that stores the emission color of the light emitting unit of each motor module for setting the function in association with the information on the installed position of the motor module within the robot. The motor module has a second storage unit that stores the color that was being emitted when the function was set. The first storage unit and the second storage unit hold memory even when the power supply is turned off. When disassembling a robot with the functions set up and then reassembling, the setting terminal has the function of displaying the arrangement information of the mounting positions within the robot of each motor module based on the information stored in the first storage unit. Each motor module may be configured to emit light with a stored color.

In this way, if on one occasion the assembled robot is disassembled and later reassembled using the same motor modules, then while watching the placement information displayed on the setting terminal, it is easy to find the motor module actually emitting the light and to easily mount it in the original position. Also, if each motor module stores and preserves the function that was set when the robot was built the previous time, the robot can easily be operated at the same time as the reassembly of the robot. In addition, in the event that each motor module does not store the set functions, because the setting terminal can specify the functions to be set for each motor module from at least the arrangement information, the functions may be automatically set.

(22) A control terminal for controlling the rotational motion of the motor module is provided, and the control unit may be configured to control the driving of the motor body in accordance with instructions received from the control terminal. In the embodiments, the control terminal corresponds to the first terminal 11 and the like.

(23) The setting terminal and the control terminal may be configured to be the same terminal. By storing the information identifying the motor module in association with each other, if the setting terminal which sets the functions in the motor modules is operated as the control terminal, control can be performed based on the stored information.

(24) The control terminal may be configured to communicate with another control terminal and instruct a control unit to operate its motor module based on instructions from the other control terminal. In this way, remote control is able to be sufficiently performed. Communication between one control terminal and another control terminal may be done through short-distance communication such as Bluetooth (registered trademark), through internet communication, or the like.

(25) The control terminal and the other control terminal communicate with each other via the internet, and the control terminal and the other control terminal are smartphones; the control terminal may be mounted on the robot and is able to stream images picked up by the imaging means of the smartphone so that the streamed video can be output on the other control terminal.

(26) The operation of the robot may be controlled so that the orientation of the control terminal is changed based on a change in position of the other control terminal as detected by the other control terminal's smartphone sensors. In this way, if applied to a telepresence robot or the like, for example, a sense of presence may be increased.

(27) At least one of either the control terminal or the setting terminal should be a smartphone. By using the equipment and functions possessed by smartphones, manufacturing and development of control terminals and setting terminals can be focused on application development and distribution, and the like for setting functions and operation control functions.

Advantage of the Invention

According to the present invention, a robot can be quickly assembled based on the necessity of the situation and can be made operable by assigning functions.

BEST MODE FOR CARRYING OUT THE INVENTION

Hereinafter, embodiments of the present invention will be described in detail with reference to the drawings. Furthermore, the present invention is not to be construed as being limited thereto, and various changes, modifications, and improvements can be made based on the knowledge of those skilled in the art without departing from the scope of the present invention.

Figure 1:
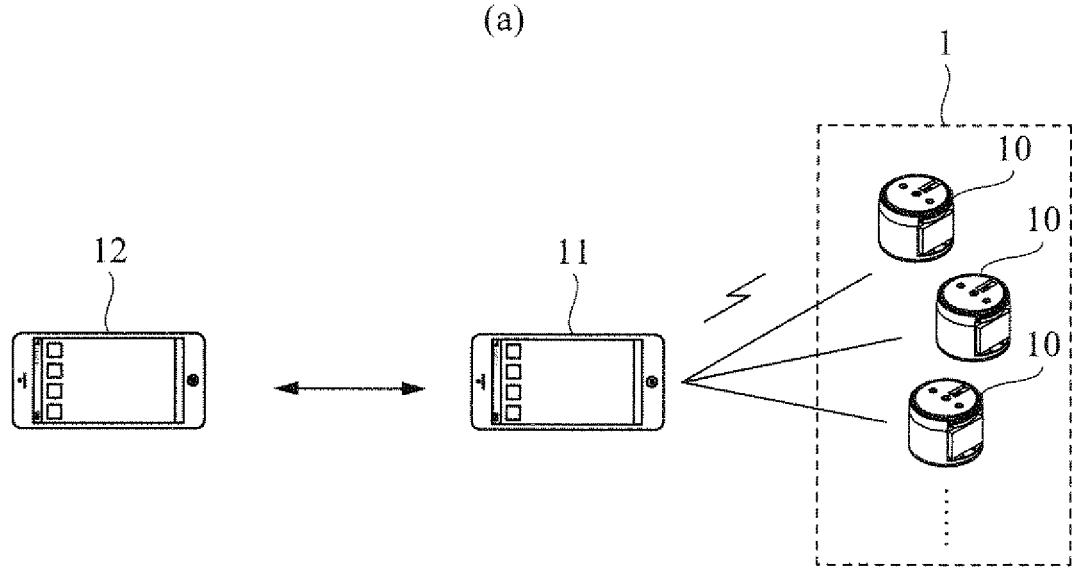
FIG. 1 is a diagram, in which (a) is a schematic configuration diagram showing a preferred embodiment of a motor module system based on the present invention, (b) and (c) are perspective views showing an example of a robot created by a motor module system.
Figure 1:
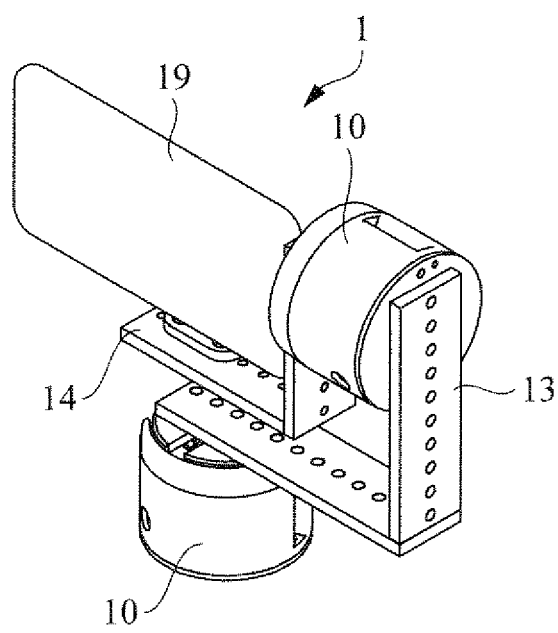
Figure 1:
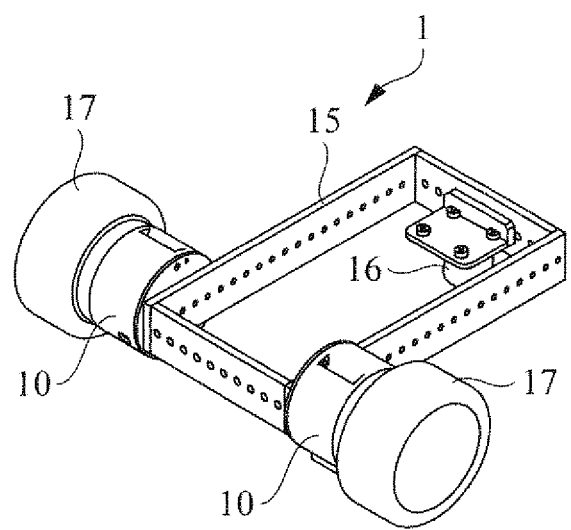

FIG. 1 shows an embodiment of a motor module system according to the present invention. As shown in FIG. 1 (a), this embodiment includes a robot 1 composed of a plurality of motor modules 10, and a first terminal 11 for assigning functions or the like to the plurality of motor modules 10.

Figure 2:
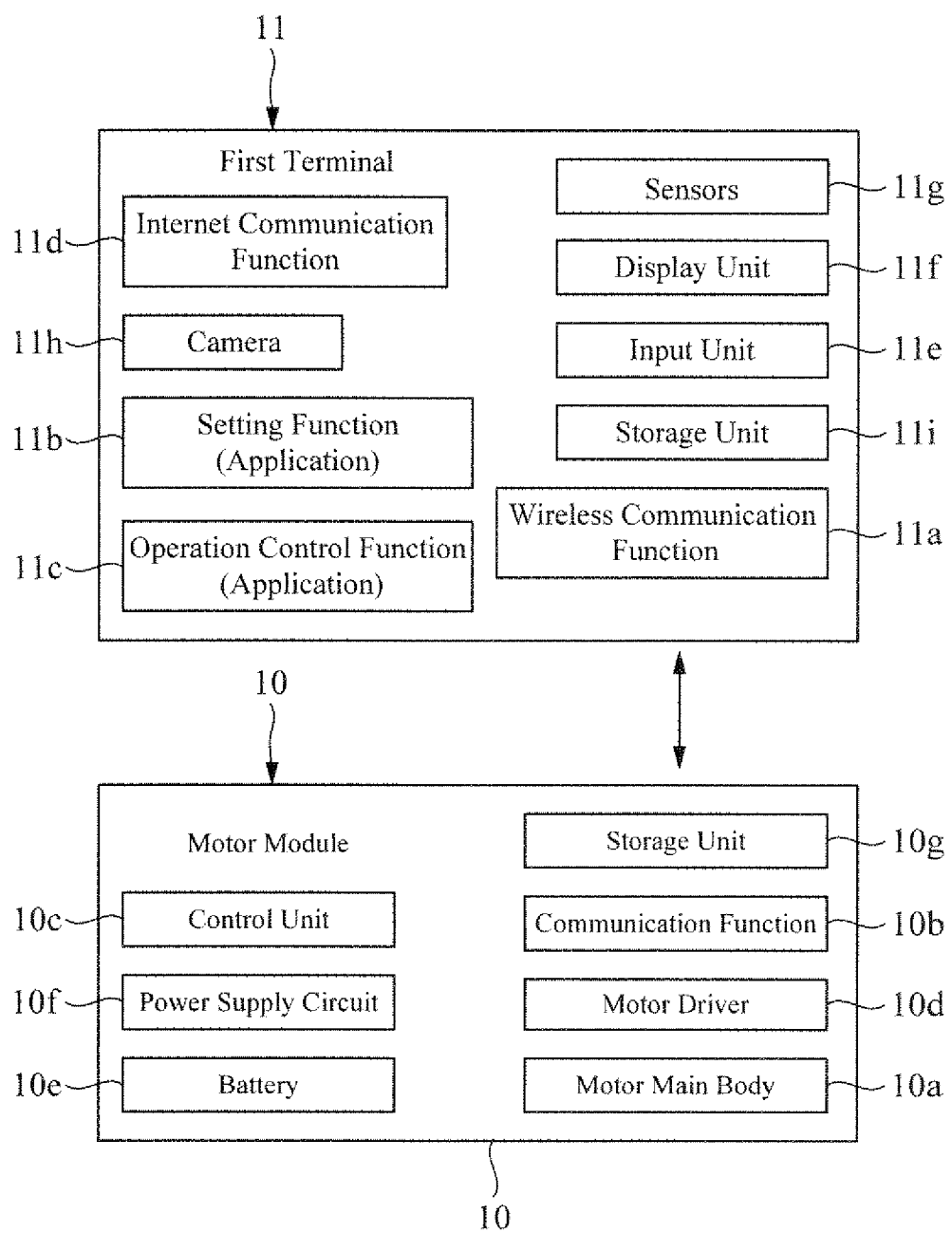
FIG. 2 is a block diagram showing an example of a motor module and a first terminal which constitutes a motor module system.

All of the plurality of motor modules 10 use the same hardware configuration. As shown in FIG. 2, the motor module 10 includes a motor main body 10a, a communication function 10b, a control unit 10c, a motor driver 10d, a battery 10e, a power supply circuit 10f, and a storage unit 10g. The communication function 10b is at least able to do wireless communication. The control unit 10c includes a microcomputer including a CPU, a ROM, a RAM, a flash memory, various peripheral circuits, an interface, and the like. As the power supply is turned on, power is supplied from the battery 10e to the control unit 10c, and operation begins. The control unit 10c expands the OS and the application program recorded in the flash memory on the RAM by the boot loader recorded in the ROM, and by executing the OS and the application program on the RAM, the functions for executing the various processes described below are able to be realized. For example, the control unit 10c receives an external command and controls the rotational operation of the motor main body 10a via a motor driver 10d. The battery 10e may be built in or detachable. If a detachable system is adopted, then by carrying a spare battery, if the capacity of the battery 10e runs out, it can be replaced with the spare battery creating a preferable robot 1 that is able to continuously work. The power supply circuit 10f is a circuit for receiving the output voltage from the battery 10e and supplying the necessary power to each part. In addition, the motor module 10 stores and holds a particular unique ID. The storage unit 10g stores and holds the set functions. In the present embodiments, a flash memory or other nonvolatile memory is used.

The first terminal 11 includes a wireless communication function 11a, a setting function 11b for assigning various settings for the motor module 10 using the wireless communication function 11a, and an operation control function 11c for controlling the operation of the motor module 10. The first terminal 11 more preferably includes an internet communication function 11d. For example, the wireless communication function 11a is Bluetooth, Wifi, LTE/3 G line, or the like. The first terminal 11 is realized by, for example, a smartphone, a personal computer, a tablet terminal, an electronic circuit board with a wireless module, or the like. If the first terminal 11 is realized by a smartphone, then the setting function 11b and the operation control function 11c are implemented by a smartphone application.

By using a smartphone in this manner, it is possible to use the general-purpose hardware resources of the smartphone itself, and also, it is good for the user to be able to use a familiar device. In addition to the wireless communication function 11a and the internet communication function 11d described above, with regard to the utilization of the general-purpose hardware resources, an input unit 11e such as a touch panel or the like which is required as a user interface for executing an application, a display unit 11f, sensors 11g and a camera 11h used for controlling operation of the robot 1, and the like can be included. Examples of the sensors 11g can be an acceleration sensor and a gyro sensor. By using the equipment and functions of the smartphone, manufacturing and development of the first terminal 11 of the motor module system can focus on application development and distribution or the like for the setting function 11b and the operation control function 11c.

Furthermore, when the first terminal 11 is configured with a smartphone, as described above, the setting function or the like can be implemented by a smartphone application. Therefore, the embodiment can be flexible enough to allow for future developments such as through downloading new functions from the cloud. By providing a smartphone OS framework and making the motors controllable, developers are able to use it for developing prototypes of various things such as robots and home appliances.

In the present embodiments, a smartphone is used, but the present invention is not limited to this, and other devices as exemplified above may be used or may be realized by dedicated terminals.

[Robot(s)]

The robots 1 configured by the motor module system of these embodiments are constructed by connecting a plurality of motor modules 10 with mechanical elements such as general-purpose frames, links, plates, etc., or by attaching parts to the motor module 10. As examples, FIG. 1(b) shows a camera pan head robot and FIG. 1(c) shows a car robot.

When briefly describing these robots, the camera pan head robot shown in FIG. 1(b) uses two motor modules 10, a first L-shaped plate 13 and a second L-shaped plate and is assembled and configured so that the directions of the output shafts of the two motor modules 10 are orthogonal to each other. Then, when the smartphone 19 is set in the second L-shaped plate 14, by rotating each motor module 10 by an appropriate angle, the smartphone 19 can be moved in the horizontal direction or the vertical direction, respectively, to a predetermined angle allowing the configuration to function as a pan head.

The car robot shown in FIG. 1 (c) is constructed by appropriately assembling two motor modules 10, a rectangular frame 15 for mounting the motor modules, wheels 17 mounted on the output shafts of the motor modules 10, and an auxiliary wheel unit 16 attached to the frame 15. In this car robot, the two wheels 17 are drive wheels. By rotating each motor module 10, the car robot is able to move in any direction.

Figure 3:
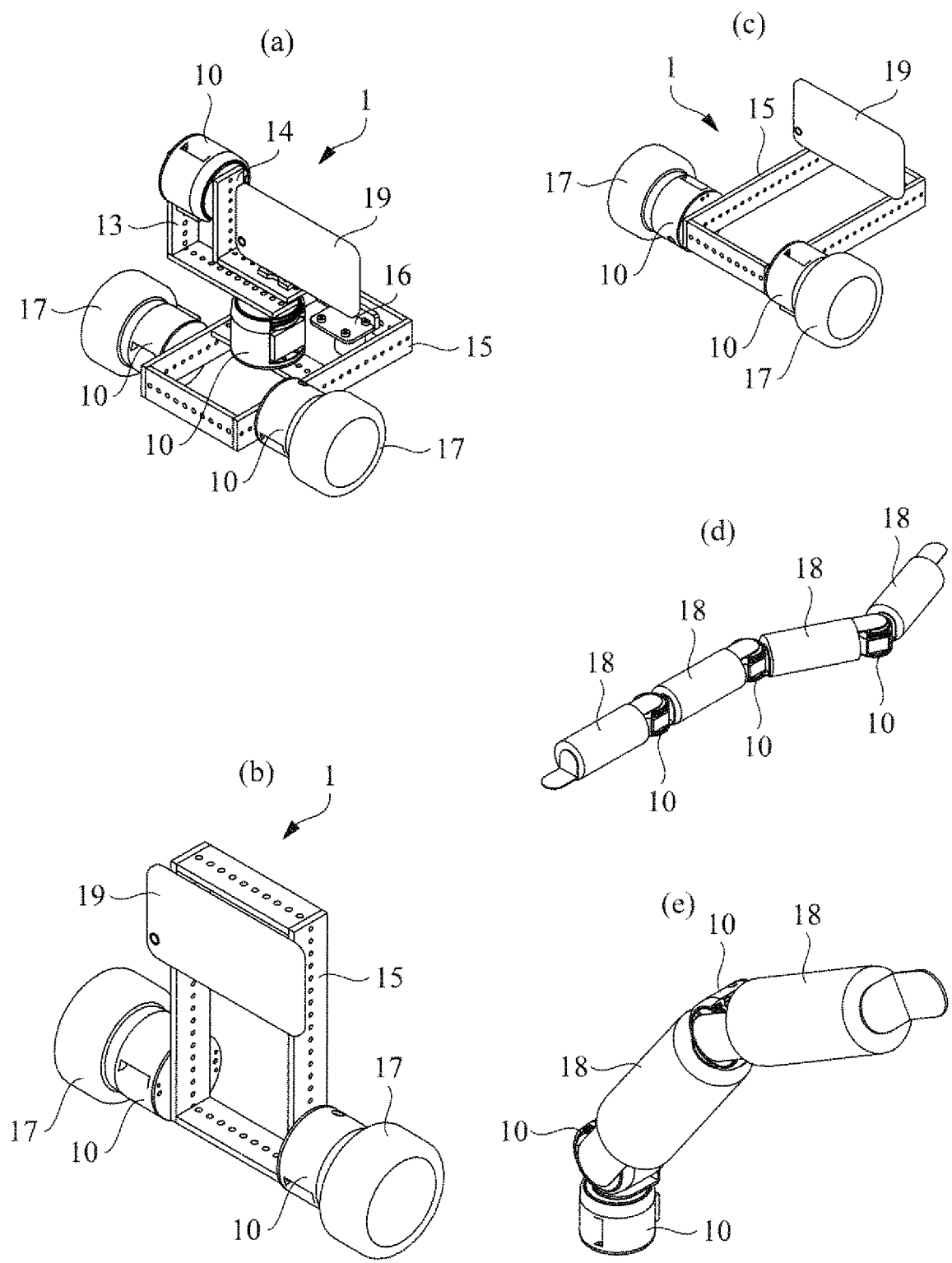
FIG. 3 is a perspective view showing other examples of robots.

The robot 1 constituted by the motor module system is not limited to those illustrated; for example, besides those shown in FIG. 3, various other configurations can be realized. The robots shown in FIG. 3 will be briefly described as follows. The robot 1 shown in FIG. 3(a) is a rover type robot which combines the above-described car robot and the camera pan head robot which is able to move in any direction and shoot a moving image or a still image while moving or after arriving at a destination. The number of motor modules 10 used in this rover type robot is two for the movement of the camera (smartphone 19) viewpoint, and two wheels on the right and on the left for a total of four for the rover type robot.

In addition, the robots 1 shown in FIGS. 3 (b) and (c) are inverted pendulum type robots. These robots are similar in structure to the car robot, but the function for controlling the operation of the motor module 10 has been changed. That is, with regard to the structure, the auxiliary wheel unit 16 has been removed from the car robot shown in FIG. 1(c) and the smartphone 19 has been attached to the frame 15. Then, based on an output signal from a detector such as an acceleration sensor or a gyro sensor mounted on the smartphone 19, the position of the smartphone 19 is obtained, and the rotation of the left and right motor modules 10 is controlled so that the position is vertical.

Furthermore, the robot 1 shown in FIG. 3(d) is a snake type robot, and the robot 1 shown in FIG. 3(e) is an arm type robot. In each case, a plurality of cylindrical blocks 18 are connected by the motor modules 10, and the motor modules 10 function like joints. In the snake robot shown in FIG. 3(d), a plurality of cylindrical blocks 18 are placed in contact with the ground, and in this state, the plurality of cylindrical blocks 18 propel themselves by performing a movement which imitates the movement of a snake.

Further, although specific illustrations have been omitted, assuming that the number of motor modules 10 is two, there are a variety of possible robots such as for example biaxial scalar robots, camera viewpoint movement (pan, tilt) automatic carriages, and mobility (moving means) robots. Also, if the number of motor modules 10 is three, there are triaxial robots, for example, camera viewpoint movement (pan, tilt, roll), CNC and the like. If the number of the motor modules 10 is four or more, for example, there are multiple axis robots, camera viewpoint movement+radio control cars (combination), humanoid robots and the like. If the number of motor modules 10 is one, there are, for example, a smart lock and a turn table.

[Using Motor Module Systems (Configurations and Control)]

When actually constructing and using the above-mentioned motor module system, it is executed as follows. First, a user prepares the parts to be attached to the motor modules 10, such as preparing the number of motor modules 10 required for the robot 1 to be built as well as the machine elements such as the frame connecting the motor modules 10, and then assembling a robot such as those shown in FIG. 1(b), (c), and FIG. 3. Since these components are able to be detachably fixed by bolts, nuts, screws, etc., a user can easily and quickly assemble the intended robot.

Next, the user sets functions in each motor module 10. That is, the first terminal 11 having the wireless communication function 11a, communicates wirelessly with each motor module 10, executes the setting function 11b setting the functions for the corresponding control unit 10c of each motor module 10 which make up the robot 1. As a result, each of the individual motor modules 10 is assigned predetermined functions, and functions as a robot. The assigned functions/applications are stored and held in the storage unit 10g. Further, when the robot 1 actually operates, for example, the control unit 10c expands the functions/application programs stored and retained in the storage unit 10g in the RAM of the control unit 10c, and can execute the necessary operations as a component of the robot. It should be noted that the control unit 10c may execute it while accessing the storage unit 10g without expanding to RAM as described above.

Further, when the functions are set in the motor modules 10, the setting function 11b specifies the specific information which specifies which motor module 10, and stores the set functions in association with each other in the storage unit 11i. For example, the unique information stored in a motor module 10 is used as the specific information. Also, instead of a particular unique ID, an arbitrary value set by the setting function 11b may be used. If an arbitrarily set value is used, this value is sent to the motor module 10 and held also on the motor module 10 side. The storage unit 11i for storing the specific information and the set functions is a flash memory or other nonvolatile memory.

On the other hand, the first terminal 11 executes the operation control function 11c and transmits the control commands to each motor module 10 using the stored specific information. Each motor module 10 performs a rotation/stop operation in accordance with the received control commands. When executing these operation control functions 11c, the first terminal 11 can be carried by a user, implemented in the robot 1, or the like. When the user is carrying, for example, the user operates the first terminal 11, upon inputting an instruction regarding the operation of the robot, the operation control function 11c accepts the instruction and outputs predetermined control commands to the motor modules 10.

If, for example, it is implemented in a robot 1, it is mounted a smartphone 19 as shown in FIG. 1 (b). In this case, as exemplified in FIG. 1 (a), a user operating the robot carries a second terminal 12, operates the second terminal 12, and inputs instructions for the operation of the robot. The second terminal 12 communicates the instructions to the first terminal 11. Then, the first terminal 11 outputs predetermined control commands to the motor modules 10 based on the instructions sent from the second terminal 12. Communication between the second terminal 12 and the first terminal 11 is preferably performed by, for example, internet communication. When the distance between both terminals is short, a wireless communication function such as Bluetooth (registered trademark), Wi-Fi, LTE/3G line, or the like may be used.

The second terminal 12 is constituted by terminals such as smartphones, tablets, personal computers, etc. that can be connected to the internet. In the case of a mobile terminal such as a smartphone, for example, by downloading and implementing the application for the operation control functions of the first terminal 11, then the same operability as the first terminal 11 can be guaranteed.

The operation control function installed in the terminal operated by the user of the first terminal 11 or the second terminal 12 is, although not shown specifically, displayed on the display screen of the display, and provides a user interface that is able to give instructions by drawing an image imitating a robot operation controller, and tapping, double tapping, long tapping or flicking a predetermined part of the image imitates the controller. In addition, the input method is not limited to one that operates intuitively, such as by touching an image imitating a controller, but for example, it is possible to adopt a method of specifically inputting a moving direction, a moving distance, and the like as numerical values. In this way, more accurate operation is guaranteed. Furthermore, when the terminal implementing the operation control function is configured using a smartphone, it is possible to detect the position of the smartphone from the acceleration sensor or the like mounted in the smartphone, or alternatively, the vibration or impact applied to the smartphone may be detected, and the detected content may be used as input information for operation control. The operation control function determines the actions or amount of motion for each motor module based on contact locations, actions, numerical values, etc., and transmits command values based on the determined content.

As described above, in the present embodiment, by assigning a "function" from the first terminal 11 which can use wireless transmissions such as from smartphones to motor modules 10, the embodiment is able to function as a robot 1. Functions for controlling the motor main body 10a are preliminarily installed by the element function of the robot and is set so as to use a desired function by the setting function 11b of the first terminal 11. The element function of the robot containing the functions may be stored, for example, in the storage unit 11i of the first terminal 11, and the required functions may be called up and sent to the motor modules 10; for example, it may be stored in the storage unit 10g of the motor modules 10 ahead of time as one for a plurality of robots, and the desired functions may be activated in accordance with the setting function of the first terminal 11. If element functions for a plurality of robots are stored ahead of time on the motor modules' side 10, it is sufficient to designate what to use when assigning functions, and then it is possible to easily and reliably perform the function setting quickly, which is preferable.

Specific function settings and the like are performed by the setting function 11b installed in the first terminal 11, so that the user can have the desired functions for each motor module 10 without needing special knowledge. By using a plurality of identical motor modules 10, it is possible to quickly create a prototype robot based on its purpose and control it using software based on its purpose, so that the robot 1 is able to be immediately operated on site. Then, machine elements such as a general frame and links may be printed by a 3D printer and connected to motor modules 10, and by assigning functions from the first terminal 11 to each motor module, it is possible to quickly create various robots.

Further, according to the motor module system of these embodiments, motor modules 10 can be added or removed based on their function, and various robots can be made with the same resources. Therefore, this system is advantageous for expandability and reusability (energy saving). Furthermore, the functions can be dynamically changed on a single basis or on a group basis for the motor modules, and regardless of the functions initially set, the control methods can be changed in the middle of operations.

In the present embodiments, each motor module 10 is controlled from the first terminal 11 by using wireless communication. Since the power to each motor module 10 is supplied from a battery 10e, it is unnecessary to externally arrange wiring or the like, and a free form robot without spatial constraints is able to be created. For example, in the case of a conventional camera robot equipped with a camera, if a change in the height of the camera in order to photograph different height positions, such as with a position higher than the current position or a lower position such as under the floor, was desired, it was necessary to change the routing of the wiring to the camera and to change the robot itself. However, in the present embodiment, the height can be flexibly changed based on the application simply by changing the length of the member holding the camera part such as a smartphone 19. Further, when the movable part is changed, it is only necessary to change the control variable from the first terminal 11 side. Similarly for arm type robots, the stroke is also able to be changed on site accordingly. As described above, in the present embodiment, since there are no spatial restrictions, just by changing the length and shape of the frame etc. according to the purpose, the function can be expanded or changed.

First Embodiment of the Motor Modules

Figure 4:
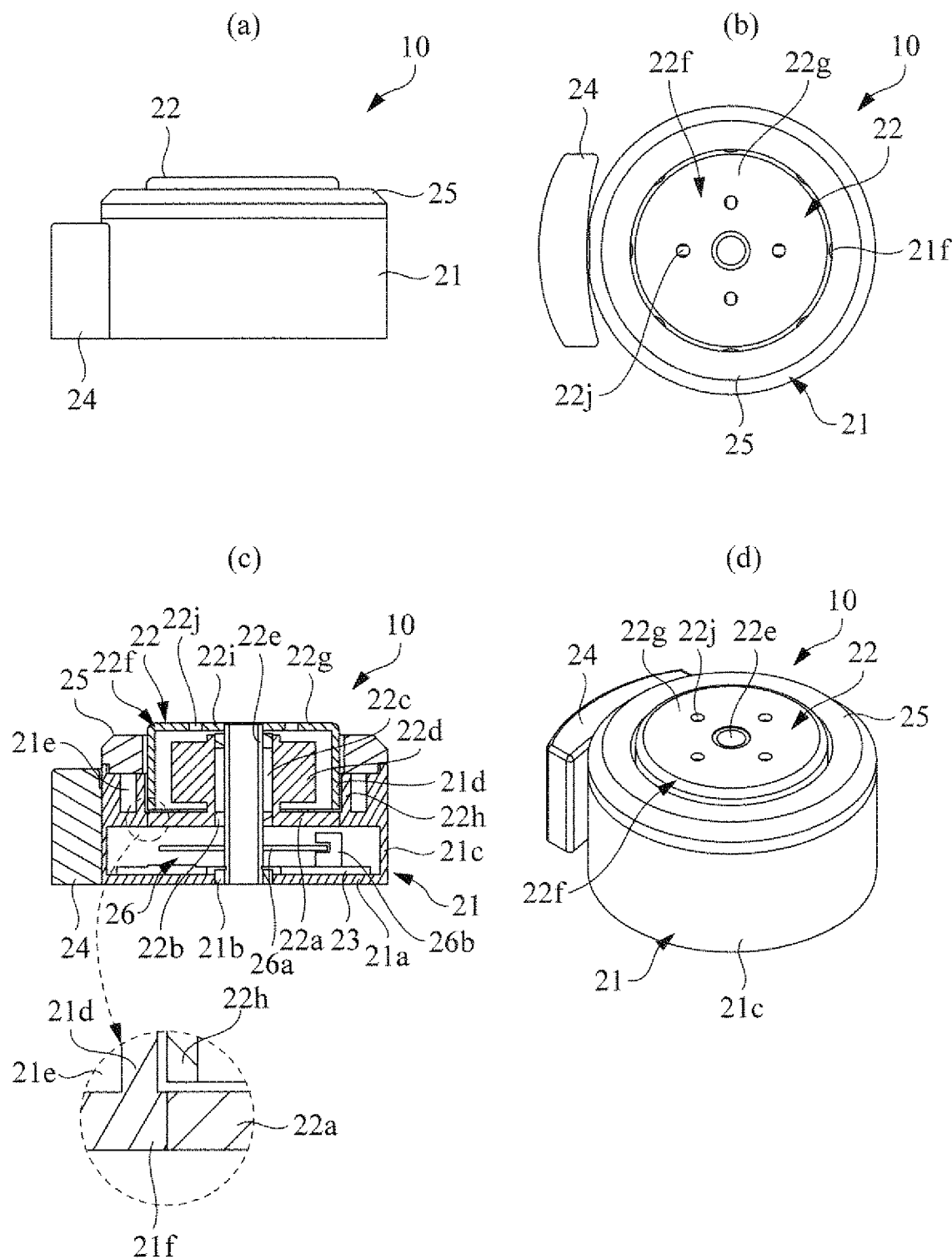
FIG. 4 is a diagram showing an example (first embodiment) of a motor module.

FIG. 4 shows a first embodiment of the motor module 10. For the motor modules 10, the motor main body 22 and the circuit board 23 are mounted in the case 21, and the battery 24 is attached to the outer peripheral surface of the case 21. The motor body 22 is a brushless DC motor in this embodiment. The circuit board 23 constitutes a communication function, a control unit and the like, and a motor driver board, a wireless communication board, and a power supply board are integrally formed. The motor body 22 is the same as the motor body 10a shown in FIG. 1. The battery 24 is the same as the battery 10e shown in FIG. 1.

The battery 24 uses a rechargeable battery. The power supply board has a power supply circuit that supplies electric power to the motor body 22 using the battery 24 as a power supply and supplies power to the motor driver board and the wireless communication board. Furthermore, in the present embodiment, the power supply board is provided with an external input DC power supply (5 V) circuit. The power supply board is provided with a charging circuit for the battery 24 when an external current is applied. The wireless communication board has a circuit corresponding to the wireless communication scheme of Bluetooth Low Energy which can be connected simultaneously with a plurality of modules.

The case 21 is based on a hollow cylindrical shape. A through hole 21b is provided in the center of the bottom portion 21a of the case 21. The upper part of the case 21 is open, and the inner cylindrical part 21d is arranged above the internal space of the case 21. The inner cylindrical portion 21d is connected to the inner peripheral surface of the cylindrical outer peripheral wall 21c at the lower end side thereof. Consequently, a concave groove 21e extending in the circumferential direction is formed between the outer side of the inner cylindrical portion 21d and the inner side of the outer peripheral wall 21c. In other words, the upper side of the outer peripheral wall 21c is formed to be thick, and an annular recessed groove 21e which opens upward is formed in the thickly formed portion. The inner cylindrical portion 21d and the outer peripheral wall 21c are arranged concentrically. At the lower end of the inner peripheral surface of the inner cylindrical portion 21d, elongated protrusions 21f extending in the vertical direction are formed at equal intervals (for example, 45 degrees) along the circumferential direction.

A protective cover 25 is attached to the upper end of the case 21. The outer diameter of the protective cover 25 is equal to the outer diameter of the outer peripheral wall 21c, and the inner diameter is equal to the inner diameter of the inner cylindrical portion 21d. The protective cover 25 occludes the concave groove 21e. Further, the protective cover 25 is formed of an elastic body such as rubber. The upper end of the motor body 22 protrudes from the upper surface of the protective cover 25.

The motor body 22 is accommodated in the inner space of the inner cylindrical portion 21d and is supported by the protrusions 21f The specific configuration of the motor main body 22 is as follows. The motor body 22 has a disk-shaped stator 22a at its bottom. In a state in which the motor main body 22 is accommodated in the inner space of the inner cylindrical portion 21d, the protrusions 21f come into contact with the outer peripheral surface of the stator 22a and supports and anchors it. A through hole 22b is formed in the center of the stator 22a. A cylindrical portion 22c is formed at the center of the upper surface of the stator 22a. The cylindrical portion 22c penetrates vertically and the lower end communicates with the through hole 22b. The inner diameter of the cylindrical portion 22c and the inner diameter of the through hole 22b are equal, and the inner peripheral surface of the cylindrical portion 22c and the through. Then, the coil 22d is arranged outside the cylindrical portion 22c.

The shaft 22e is inserted into the cylindrical portion 22c so as to penetrate the shaft 22e vertically and the bearings are supported. The cylindrical portion 22c and the shaft 22e are arranged concentrically, and the shaft 22e is rotatable about the central axis in the vertical direction. The lower end of the shaft 22e is located in the through hole 21b provided in the bottom portion 21a of the case 21, and rotation is permitted. In addition, the shaft 22e has a cylindrical shape with upper and lower openings.

A rotor 22f is connected to the upper end of the shaft 22e. The rotor 22f has a disc-shaped top panel 22g and a cylindrical peripheral wall 22h extending downward from the outer peripheral edge of the top panel 22g. The opening 22i is provided in the center of the top panel 22g, and the shaft 22e is inserted in the opening 22i and anchored. As a result, the upper end opening portion of the shaft 22e is exposed. Further, the top panel 22g has a female screw portion 22j. The female screw portion 22j is formed on the inner peripheral surface of the through hole vertically penetrating the top panel 22g. However, the lower end of the peripheral wall 22h is positioned in the vicinity of the outer peripheral edge of the upper surface of the stator 22a. Further, the outer diameter of the peripheral wall 22h is smaller than the inner diameter of the inner cylindrical portion 21d. The protrusions 21f do not face the peripheral wall 22h, and instead are brought into contact only with the stator 22a. As a result, a predetermined gap is formed between the peripheral wall 22h of the rotor 22f and the inner cylindrical portion 21d. Therefore, the rotor 22f becomes rotatable about the shaft 22e.

When the motor body 22 is driven by the motor driver, the rotor 22f rotates. In other words, the rotating output portion of the motor module 10 of the present embodiment is a disk-shaped top panel 22g or a shaft 22e. That is, by attaching mechanical elements and parts to the top panel 22g with screws or the like or by inserting various members into the opening of the shaft 22e, attached mechanical elements, parts, members, etc. rotate together with the rotor 22f Since the top panel 22g is a flat surface, mechanical elements and parts can be stably anchored, and the number of attachable elements can also be increased.

Furthermore, the motor modules 10 of the present embodiment appear to have a cylindrical shape and has a shape similar to a general motor. Therefore, the user is able to assemble a robot with the sense of using a general motor. Further, the outer dimensions of the motor modules 10 are preferable because they are not significantly larger than the motor main body 22, and as whole is more compact. Particularly, in the configuration shown in FIG. 4, a rotary encoder 26 as described later is provided. However, by configuring the motor main body 22 with a stepping motor or the like, for example, it can be made more compact without using the rotary encoder.

Application Example of the Deceleration Mechanism Unit

Figure 5:
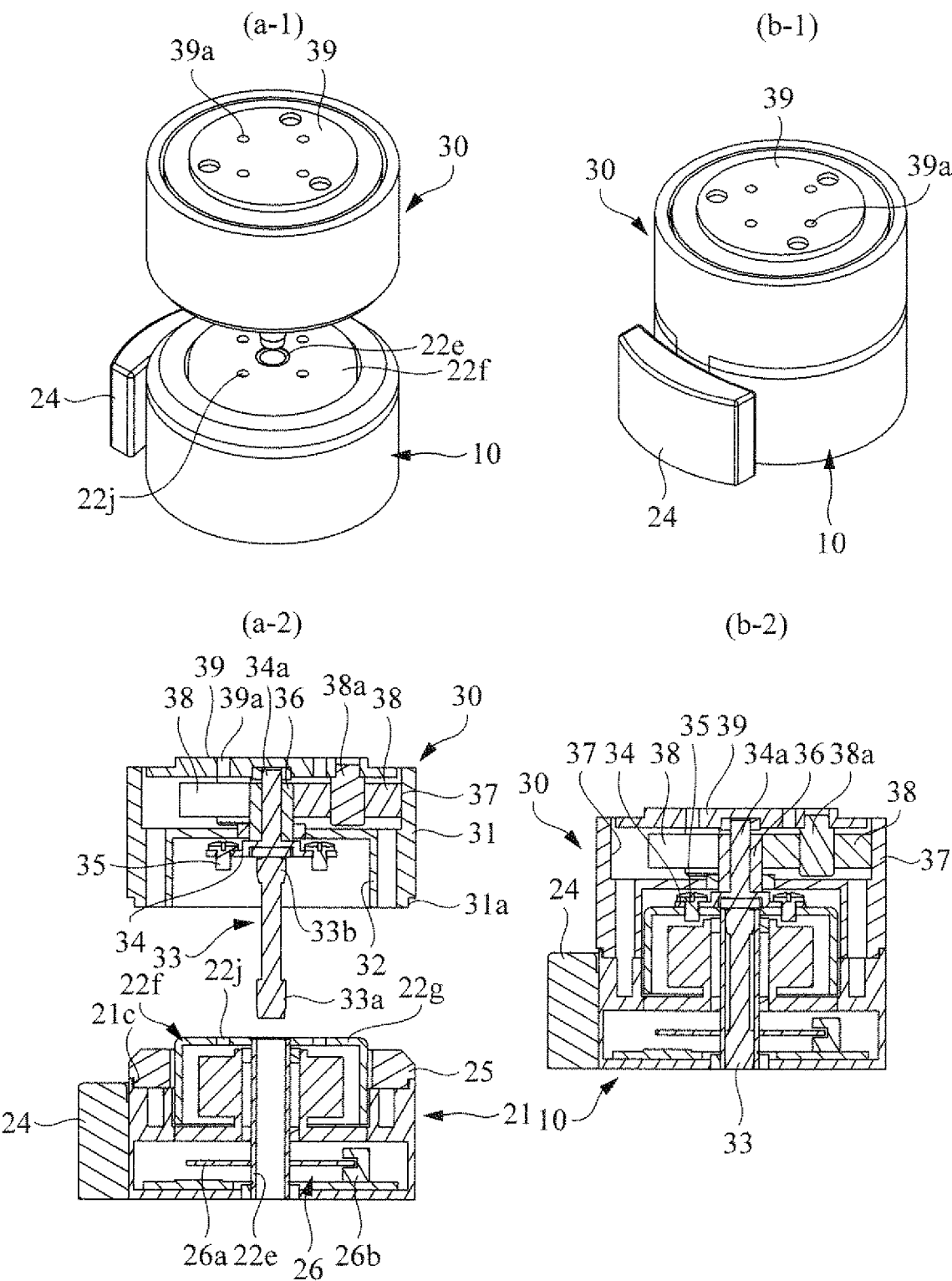
FIG. 5 is a diagram showing an example of a motor module which includes a deceleration mechanism unit.

An example of the object inserted into the opening of the shaft 22e and mounted on the motor modules 10 is a deceleration mechanism unit. As shown in FIG. 5, with respect to the deceleration mechanism unit 30, a predetermined gear is mounted in the cylindrical case 31 which opens vertically. The deceleration mechanism unit 30 is provided with an input shaft 33 so as to protrude below the case 31. The outer diameter of the lower portion 33a and the upper portion 33b of the input shaft 33 is thicker than the intermediate portion. The outer diameter is equal to or slightly larger than the inner diameter of the shaft 22 e of the motor body 22. Thereby, when the input shaft 33 is inserted into the shaft 22 e of the motor body 22, the thickened lower portion 33a and the upper portion 33b are firmly attached and anchored to the inner circumferential surface of the shaft 22e, and the shaft 22e and the input shaft 33 rotate integrally.

The upper end of the input shaft 33 is fixed to the center of the lower surface of the disc-shaped coupling plate 34. The coupling plate 34 is able to come into contact with the top panel 22g of the motor body 22, and by fastening the screw 35 to the female threaded portion 22j in a contacted state, the coupling plate 34 and the top panel 22g are connected. As a result, the deceleration mechanism unit 30 receives the rotational force of the motor body 22 from both the top panel 22g and the shaft 22e and is stably connected to the output portion of the motor main body 22. In the case of adopting a method of fixing with a screw 35 as in this embodiment, at least the input shaft 33 and the connecting plate 34 can be detached from the case 31 side, with the upper part of the connecting plate 34 opened, the connecting plate 34 is placed on the top panel 22g of the rotor 22f and screwed. Then, another part is set thereafter.

At the center of the upper surface of the connecting plate 34, a rotating shaft 34a is integrally formed upright. Therefore, when the motor main body 22 rotates, the rotating shaft 34a also rotates at the same rotation speed. In the present embodiment, the connecting plate 34 having the rotating shaft 34a and the input shaft 33 are formed as separate members and connected to each other; however, they 1; may be integrally formed and configured as one component.

A sun gear 36 constituting a speed reduction mechanism is mounted on the rotating shaft 34a. Moreover, an internal gear 37 is formed above the inner peripheral surface of the case 31. Three planetary gears 38 are arranged in the case 31 so as to mesh with the sun gear 36 and the internal gear 37. The rotating shaft 38a of the three planetary gears 38 is linked to the rotating plate 39 so as to rotate on its own axis. As a result, when the planetary gears 38 revolve around the sun gear 36 while rotating, the rotating plate 39 rotates in synchronization with the orbital displacement. The rotational speed of the rotating plate 39 is decelerated at a speed determined by the gear ratio of each gear. The diameter of the rotating plate 39 is made smaller than the inner diameter of the case 31 and arranged so as to be accommodated in the case 31.

Moreover, the outer diameter of the case 31 is made equal to the outer diameter of the case 21 of the motor module 10. An inner cylindrical portion 32 is provided below the inner space of the case 31. The diameter of the inner cylindrical portion 32 is made equal to the diameter of the inner cylindrical portion 21 d provided in the case 21 of the motor module 10. Furthermore, at the lower end of the outer peripheral surface of the case 31, a concave cutout portion 31a is provided along the entire circumference in the circumferential direction. Also, on the upper end of the inner circumferential surface of the outer circumferential wall 21c of the case 21 of the motor module 10, a concave cutout portions 21c' is provided along the entire circumference in the circumferential direction.

As a result, as shown in FIGS. 5 (b-1) and (b-2), when the deceleration mechanism unit 30 is attached to the motor module 10 and integrated into the motor module 10, the outer circumferential surface of the deceleration mechanism unit 30 and the outer circumferential surface of the motor module 10 form a smooth and continuous cylindrical shape in the vertical direction. Prior to this attachment, the protective cover 25 is removed. Therefore, the case 31 of the deceleration mechanism unit 30 and the lower end of the inner cylindrical portion 32 as well as the outer peripheral wall 21c and the inner cylindrical portion 21d of the case 21 of the motor module 10 abut each other and come into contact with each other. Further, the cutout portion 31a at the lower end of the case 31 of the deceleration mechanism unit 30, and the cutout portions 21c' at the upper end of the outer peripheral wall 21c of the case 21 of the motor module 10 coincide with each other, and the connection strength increases.

By attaching the dedicated deceleration mechanism unit 30 to the motor module 10 in this way, it is possible to change the output (torque) and speed characteristics of the motor module 10 depending on the application and the purpose. The deceleration mechanism unit is removable.

Accordingly, in the case of applications requiring a speed reducer, the motor module 10 can be commonly used by attaching the deceleration mechanism unit 30 to the motor module 10. Also, if you dismantle the robot using the motor modules 10 with the deceleration mechanism unit 30 attached but you do not need the speed reducer for use in another robot, removing the deceleration mechanism unit makes it possible to reuse the motor module 10. Also, if the deceleration mechanism unit 30 being used fails, by replacing the deceleration mechanism unit 30, the motor module 10 can still be used as it is. Therefore, it is good that the motor module 10 can be used efficiently.

Also, it is advisable to prepare a plurality of deceleration mechanism units 30 having different reduction ratios. By doing so, it is only necessary to suitably select and use those having a reduction ratio based on the application.

Application Example of a Rotary Encoder

In the embodiment described above, the rotary encoder 26 is mounted below the internal space of the case 21. The rotary encoder 26 includes an encoder wheel 26a attached to the shaft 22e and a detector 26b such as a photoelectric element disposed on the circuit board 23 that detects the rotational position of the encoder wheel 26a. The rotary encoder 26 detects the rotation angle of the motor main body 22 including the brushless DC motor, and the motor driver controls the operation of the motor main body 22 based on the detection results.

In the present embodiment, the example in which the motor main body 22 is constituted by a brushless DC motor has been described, but the present invention is not limited thereto, and various motors can be used. As an example, if a stepping motor is used, the rotation angle can be controlled easily and accurately.

[Communication Systems]

Figure 6:
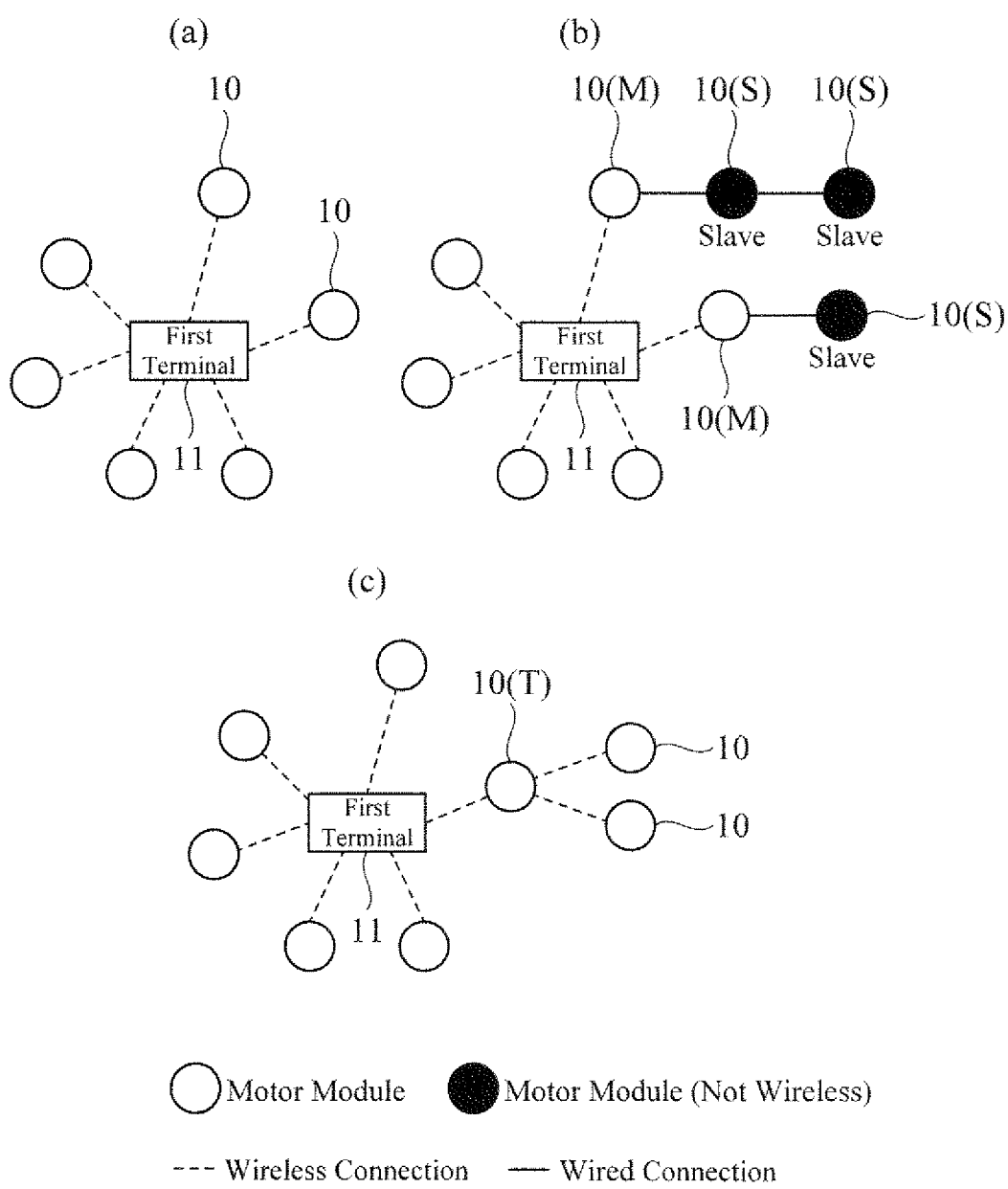
FIG. 6 is a diagram for explaining a communication system.

In the above-described embodiments, as shown in FIG. 6 (a), all the motor modules 10 are each wirelessly controlled by communicating with the first terminal 11. Further, a battery 24 is mounted on each motor module 10, and each motor module 10 is independently supplied with power. However, the present invention is not limited to this, wired lines may be used for control instructions, power supplies, etc., depending on the parts needed. For example, as shown in FIG. 6 (b), one or a plurality of motor modules 10 (S) are connected by wires to motor modules 10 (M) controlled by wireless communication with the first terminal 11. The motor module 10 (M) which become the masters and the motor modules 10 (S) become the slaves. Master-slave communication is performed between the motor modules, and the motor modules 10 (M) control and manage the operation of the motor modules 10 (S). As a result, even if strict synchronization is required for control, this can also be handled.

Also, instead of the control by the master-slave communication as described above, as shown in FIG. 6 (c), the motor modules 10 can wirelessly communicate with each other, and the first terminal 11 may indirectly control another motor module via the motor module 10 (T).

In addition, when it is necessary to operate for a long time with a fixed power supply or an external power supply, it is also possible to include one that connects the power line to the motor module by wire. Furthermore, a plurality of motor modules may be connected by a power supply line, for example, a large capacity battery may be mounted on one motor module 10 and power may be supplied to another motor module via the power supply line.

Application Example of a Setting Function
(Function Assignment)

Next, a specific processing procedure for the functions assigned by the setting function will be described with reference to FIG. 7. The setting function 11b and the control units 10c of the motor modules 10 are able to execute the processes described below.

Figure 7:
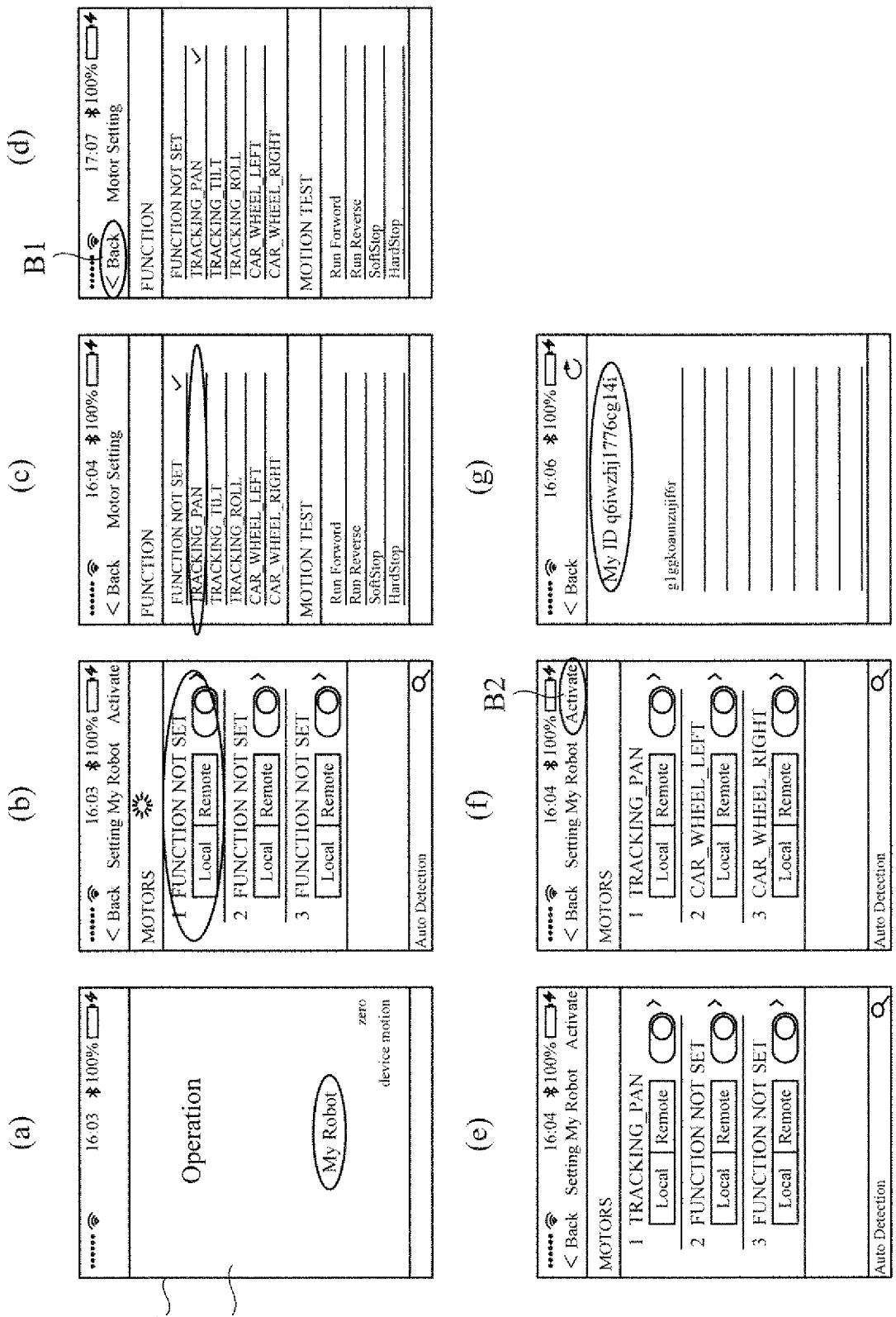
FIG. 7 is a diagram for explaining setting functions.

FIG. 7 shows an example of a display screen of the first terminal 11 that has executed an application of the setting function 11b. That is, the setting function 11b has the function of transitioning the display screens shown in FIG. 7. FIG. 7(a) shows the initial screen. In the present embodiment, an application related to the motor module system (the setting function 11b and the operation control function 11c) is implemented as one application, and when the application is activated, an initial screen shown in the figure is displayed. When launching the application, if the control unit (CPU) of the smartphone detects that the icon of the application displayed on the display unit 11f is touched, then it invokes and executes the corresponding application stored in the storage unit. Because the startup/execution processing of such an application performed by the control unit is a basic function implemented in the smartphone, a detailed explanation will be omitted. In addition, in the following description, the process performed by the above control unit may be described simply as an executed "application" or the like.

In the initial screen shown in FIG. 7(a), a layout is displayed in which a menu items of "Operation" indicating the operation control function and "My Robot" indicating the setting function are displayed. When "My Robot" detects a touch, the setting function is activated and transitions to the "catalogue list display screen of the motor modules" shown in FIG. 7 (b). That is, the setting function 11 b transmits a response request signal to the surrounding motor modules using the wireless communication function 11a. Upon receiving the response request signal, the control units 10c of the motor modules 10 transmit their own unique ID as a response signal. The setting function 11b recognizes the surrounding motor modules 10 according to the received unique ID, assigns a record number in the order of reception, and creates and displays a catalogue list. For each motor module, the list has a layout in which "record number", "function", "Local/Remote selection button", and "Enable/Disable buttons" are arranged in a row in ascending order from 1.

The initial value of "Function" displays "FUNCTION NOT SET" indicating that a function has not been set. The "Local/Remote selection button" is a button for selecting whether or not to permit control via the internet. Each time the display area of "Local/Remote Selection Button" is tapped, the operation control function 11c alternately transitions between "Local" and "Remote". When "Remote" is selected, control via the internet is permitted. When "Local" is selected, control via the internet is not permitted. For example, the second terminal 12 and the first terminal 11 are connected by short-distance wireless communication, if the user operates the second terminal 12 and controls operation of the robot via the first terminal 11, because internet communication has not been used, it corresponds to the "Local" designation.

The "Enable/Disable button" is a button for selecting whether or not a setting can be made for a communicable motor module. Every time the "enable/disable button" is tapped, the round button element moves alternately to the left and right. As shown in the figure, when the round button element is positioned on the right, it is possible to set a function for the motor module. If the "enable/disable button" is tapped in this state, the round button element moves to the left and the setting of the function for the motor module is not accepted. Therefore, for example, for a motor joule that has already set its function, by setting such a setting, there is no possibility of erroneously changing and setting different functions.

A user touches the display unit of "Function" for the motor module to be set. In the example shown in FIG. 7(b), a motor module with record number 1 is selected. If the setting function 11b detects that the area of "Function" is touched, it displays the "motor module function assignment screen" shown in FIG. 7(c). This "motor module function assignment screen" shows a list of settable function and a check column indicating the currently set function. The setting function 11b puts a check "✓" the function currently set. In FIG. 7(c), a check is placed next to the initial value "FUNCTION NOT SET".

Further, the setting function 11b transmits a provisional operation command signal to the motor module 10 of the designated record number. That is, when the setting function 11b receives the response signal and creates the catalogue list, the setting function 11b stores the acquired unique ID and the record number in association with each other. The setting function 11b transmits a provisional operation command signal to the motor module of the corresponding unique ID based on the stored information.

The control unit 10c of the motor module 10 that has received the provisional operation command signal temporarily operates the motor main body 10a via the motor driver 10d. By provisional operation of the motor main body 10a, a user is able to know which motor module 10 is the function setting target. The provisional motion is a rotation of the rotation output unit forward and reverse in a predetermined angle range. The predetermined angular range is, for example, in a range of ±5 to ±15 degrees. In this provisional operation, since robots are formed by combining a plurality of motor modules 10, it is difficult to know which motor module 10 provisionally operates if the operating angular range is small. However, since the provisionally operating motor module 10 is one of a plurality of motor modules 10, if it is too large, the robot may lose its balance, unnecessarily large movements may occur, or it may hit surrounding objects. Therefore, it is preferable to set it within the above angle range.

A user who sees the provisional operation can visually specify the motor module 10 for setting the function, and tapping the function to be set. For example, it is assumed that "TRACKING PAN" is tapped in FIG. 7(c). "TRACKING PAN" is a function to rotate the camera horizontally in the camera head. For example, in the robot of the camera pan head shown in FIG. 1(c), the motor module installed on the lower side corresponds. Upon detecting that the function name area is tapped, the setting function 11b sets programs, functions, and the like necessary for executing "TRACKING PAN" in the control unit 10c of the motor module 10 via the wireless communication function 11a. If such setting is completed, the control unit 10c of a motor module 10 temporarily operates the motor main body. As a result, the user is able to check by viewing the provisional operation, thereby confirming that the setting of the function has been performed and that the desired motor module is selected. In addition, the setting function 11b erases the check next to the initial value "FUNCTION NOT SET" displayed on the "function module assignment screen of the motor module" and also places a check "✓" next to "TRACKING PAN" (see FIG. 7 (d)). As a result, the assignment of the function for the motor module of record number 1 is completed.

The user then sets the settings for another motor module. In the "motor module function assignment screen" shown in FIG. 7 (d), the user tapped the "return" button B1 displayed above the screen. If the setting function 11b detects that the "return" button B1 has been tapped, the setting function 11b transitions to "motor module catalogue list display screen" (see FIG. 7 (e)).

As shown in FIG. 7(e), in the "motor module catalogue list display screen" displayed, the function of the motor module of record number 1 set earlier becomes "TRACKING PAN", and the result of the function setting is reflected. Since the record numbers 2 and 3 have not yet been set, the "function" remains "FUNCTION NOT SET".

Thereafter, as shown in FIG. 7(f), assignment of functions to all the motor modules listed is completed by repeating the processes of FIGS. 7(b) to 7(e).

Next, a plurality of motor modules 10 with functions assigned are registered as a group of motor modules constituting one robot. This registration is carried out by tapping the "ACTIVATE" button B2 provided above the "motor module catalogue list display screen".

When detecting that the "ACTIVATE" button B2 has been tapped, the setting function 11b registers the plurality of motor modules as constituting one robot in the first terminal 11. When registering a robot, a robot ID (MyID) for identifying the robot is provided. In the first terminal 11, along with the robot ID, identification information for specifying each motor module constituting the robot, information on the set function and the like are stored.

Further, in the present embodiment, in response to an instruction command from the second terminal 12, position information of the registered robot is registered in the server in association with the robot ID in order to remotely control the robot. The position information of the robot is, for example, an address on the internet (an address which can be accessed via the internet such as an IP address) of the first terminal 11 which directly controls the robot. The second terminal 12 can communicate with the first terminal 11 using the internet communication function by accessing the server and acquiring the robot's position information. As described above, the second terminal 12 sends a control command for the robot 1 to the first terminal 11, for example, by implementing an operation control function, and controls the desired motor modules 10 constituting the robot via the first terminal 11.

Then, when the registration of the robot has been completed, the setting function 11*b* of the first terminal 11 shifts into standby mode as shown in FIG. 7(*g*). In standby mode, it displays robot function, location information, robot ID, etc.

In addition to the position information of the first terminal 11 on the network, or in addition to the position information on the network, the robot position information may be the actual existence position of the robot. For example, when the robot 1 is operated remotely by operating the second terminal 12, it is sufficient to identify the robot's actual existence position and specify the robot to be operated.

In the above-described embodiment, provisional operations were made twice, when specifying the motor module and when setting the function. By doing this twice, it is possible to prevent setting the wrong function for a motor module. However, these provisional operations do not necessarily need to be performed twice, and may be done only once. However, it is preferable in terms of preventing erroneous settings that it is done twice. On the other hand, in consideration of suppressing battery consumption, once is better.

In this embodiment, the target motor module is provisionally operated after selecting the motor module to be set on the screen of FIG. 7 (*b*), but the present invention is not limited to this. For example, a pre-specified motor module performs a provisional action, and after confirming the target motor module 10 through provisional operation, the function assignment screen may be changed. In such a case, for example, when tapping the "DESIGNATING BUTTON" once, it provisionally operates, and when an operation different from the provisional operation such as tapping twice or swiping or flicking continuously is performed, it is preferable to transition to the "function module allocation screen of motor module".

[Remote Operation of a Robot Via the Internet]

Figure 8:
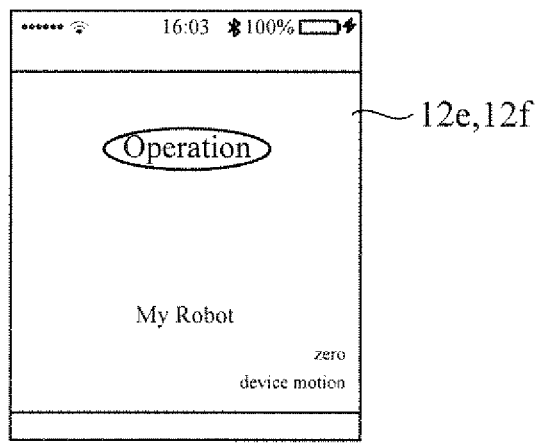
FIG. 8 is a diagram for explaining an example of remote control.
Figure 8:
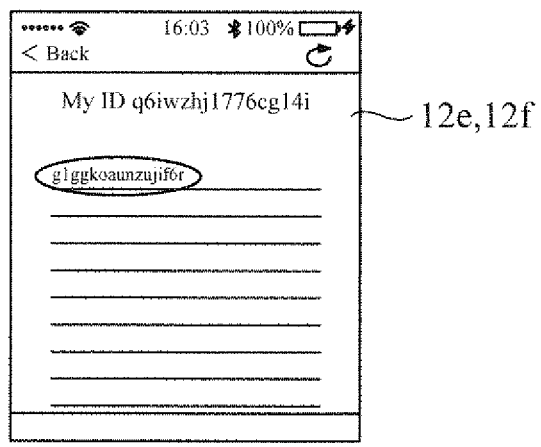
Figure 8:
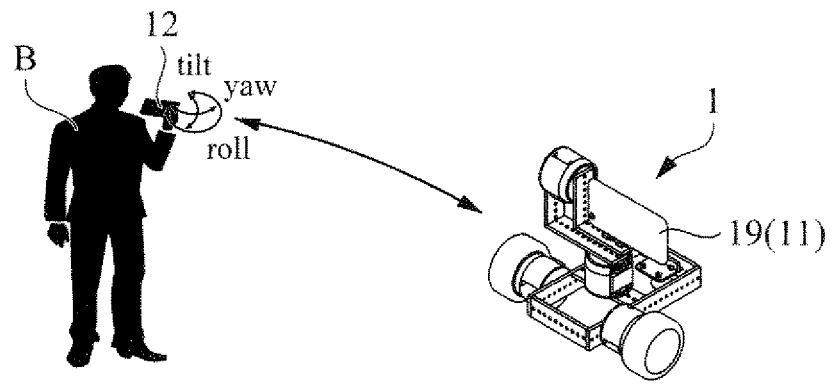
Figure 8:
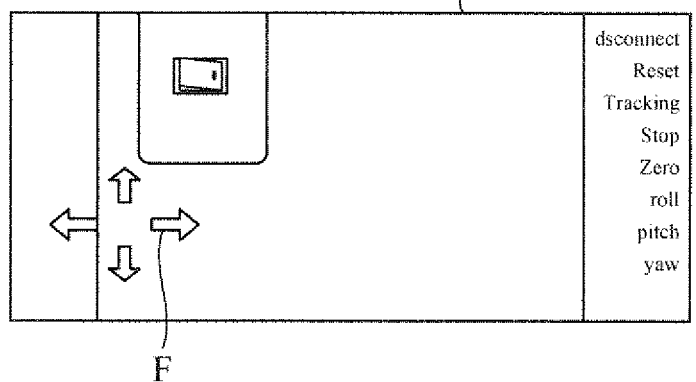

FIG. 8 shows a concrete embodiment of an operation control function for controlling a robot using the second terminal 12. The operation control function, the control units 10*c* of the motor modules 10, and the like are able to execute the processes to be described below. FIG. 8 (*a*) shows an example of the display screen of the second terminal 12 which has executed the application of the operation control function for the second terminal 12. The robot 1 of this embodiment is a rover type robot. The rover type robot has a smartphone 19 as the first terminal 11. Further, in the present embodiment, the image/video image captured by the camera 11*h* of the first terminal 11 is transmitted to the second terminal 12 and displayed on the display unit of the second terminal 12. As a result, the user operating the second terminal 12 can check the situation around the robot 1 without directly viewing the robot 1. Therefore, the user is able to properly and remotely operate the robot 1 while watching the display unit of the second terminal 12. The process for performing such remote control is as follows.

First, a person who prepares and provides the robot 1 (hereinafter, user A) performs the following process. Basically, the aforementioned setting function (function assignment) is performed. User A operates the first terminal 11 to activate a dedicated application (setting function 11*b*) and connects (pairs) the first terminal 11 and the motor modules 10 by wireless communication such as through Bluetooth Low Energy. User A then executes the setting function and assigns a function to each motor module 10. Then, the setting function registers the functions of the plurality of motors to which the functions have been assigned with the first terminal 11 as the settings for the robot. Thereafter, the first terminal 11 functions as the controller for driving and controlling the operation of the robot 1, more specifically, the motor modules 10. Furthermore, the setting function registers the robot in a list on the server and acquires a robot ID for communication. After that, the first terminal 11 enters a standby state and is in a standby state from another terminal via the internet.

In addition, the first terminal 11 maintains a state of being connected to the motor modules 10 by short-distance wireless communication, and is placed in a position where it can communicate with the robot 1. As long as it can communicate with the robot 1, it may be placed independently from the robot 1, but as shown in FIG. 8(*c*), it is more preferable to be incorporated as a smartphone 19 (11) and mounted on the robot 1. That is, as will be described later, a user who operates a second terminal 12 (hereinafter referred to as User B) is able to operate the robot 1 from a remote location distant from the position of the robot 1 by using the internet communication function. Therefore, User B needs to be able to confirm the situation of the robot 1 or the situation around the robot 1 from a remote place. Therefore, the first terminal 11 is incorporated in the robot 1; for example, as shown in the rover type in FIG. 8 (*c*), the surrounding situation is picked up using the camera 11*h* of the smartphone 19 constituting the first terminal 11, and the captured images are displayed on the display section of the second terminal 12 using the internet communication function. Then, User B can check the circumstances of the robot 1 while watching the video displayed on the display unit of the second terminal 12, so that appropriate operation can be performed. Since it is unnecessary to separately prepare devices and systems for communicating the surrounding images, remote operation with a simple system configuration can be done. The processing functions for performing a specific remote control are as follows.

User B operates the second terminal 12 and inputs an activation instruction for a dedicated application such as, for example, by the tap of an icon displayed on the display unit. In this embodiment, this dedicated application is an integrated one incorporating a setting function and an operation control function implemented in the first terminal 11. Upon accepting the operation from User B, the second terminal 12 starts a dedicated application and displays an initial screen as shown in FIG. 8(*a*), for example, on the display unit 12*f*. User B taps "Operation" indicating the operation control function. With respect to the second terminal 12, since the touch panel as the input unit 12*e* is placed over the display unit 12*f*, the operation control function accesses the server when the display area of "Operation" is tapped, and the list of remote-controllable robots stored in the server is displayed on the display unit 12*f* (see FIG. 8(*b*)). To display this list, for example, the second terminal 12 acquires the catalogue list information stored in the server, and creates a list display list for display based on the acquired information; although the list may be output, for example, by accessing the server with the internet communication function, it is better to display it in the form of a web page, for example, using the browser display function to store information stored in the server In FIG. 8(b), only one robot ID is displayed. User B selects the robot that he wishes to operate and calls it. The robot selection process is performed by, for example, tapping on the robot ID. In FIG. 8 (b), only the robot ID is displayed, but it is preferable to also display other information on the robot which can be remotely controlled via the internet such as the robot's location (address) and function. By displaying various types of information in this manner, when there are, for example, a plurality of robots that can be operated remotely via the internet, it is possible to easily and appropriately find the desired robot.

The operation control function of the second terminal 12 for the tapped robot ID, proposes to start communicating using the internet communication function. The offer to start communication is actually made to the first terminal 11 which controls the robot operation corresponding to the robot ID. Then, the offer to start communication can be easily accessed for example, by associating a URL or the like for accessing the first terminal with the hypertext on the displayed robot ID.

When the first terminal 11 in the standby state receives a call, it starts communication with the second terminal 12. Then, both terminals execute the remote operation mode, and the second terminal 12 receives an input from User B and sends instructions such as various operation execution commands to the first terminal 11. In accordance with the instructions from the second terminal 12, the first terminal 11 controls the operation of the motor modules and sends various kinds of information to the second terminal 12.

If used as a telepresence robot that can be operated remotely, the first terminal 11 starts the streaming of video and audio acquired using the equipped camera 11h and microphone that comes standard with the smartphone, and starts a data channel for transmitting and receiving binary data.

The operation control function of the second terminal 12 outputs the above-mentioned streaming-distributed video to the display unit 12f of the second terminal 12. As a result, as shown in FIG. 8(d), for example, the live image captured by the camera 11h of the first terminal 11 is displayed on the display unit 12f of the second terminal 12. In addition, the operation control function of the second terminal 12 outputs the above-mentioned live audio streaming to the speaker of the second terminal 12.

User B operates the second terminal 12 to control the operation of robot while viewing and listening to the live video displayed on the display unit 12f of the second terminal 12 and the live audio output from speaker. In order to perform such control, the operation control function of the second terminal 12 displays an instruction input unit for inputting an operation command on the display unit 12f In FIG. 8(d), the arrow keys are displayed as the instruction input unit F. To input an operation command using this instruction input unit F, tap or long press the arrow portion. As shown in FIG. 8(c), in the present embodiment, since the functions of the right and left wheels are assigned to two specific motor modules 10, it is possible to wirelessly operate by operating the arrow keys. Assigning an instruction of an operation command specifies the traveling direction by, for example, pressing an arrow. For example, if you press two arrows, you perform both operations (for example, go forward and turn left). Also, while pushing the arrow, the motor module rotates and the robot 1 moves, and when the finger is released from pushing the arrow, rotation of the motor module stops, and the robot's movement stops.

In order to perform such control, the operation control function of the second terminal 12 transmits a robot operation command according to the input operation command. Upon receiving the robot operation command, the operation control function of the first terminal 11 performs control to operate each motor module 10 according to the setting of robot.

In the illustrated example, the instruction input unit F controls the movement direction by the arrow keys, but an instruction input unit for instructing to increase or decrease the speed is displayed separately, and the movement speed of the robot 1 may be controlled in accordance with the rotation speed of the motor modules 10. With respect to the instructions for increasing or decreasing the speed, as described above, an instruction input unit for displaying the instructions separately from the arrow keys may be used; for example, if the smartphone constituting the second terminal 12 is able to detect the tap strength on the display unit 12f, the pressure applied to the arrow keys portion may be detected and controls the speed based on the magnitude of the pressure. By doing so, you can operate the direction and speed control with one hand. Also, arrow keys may be eliminated, and the direction of travel may be entered, for example, by a swipe operation.

Further, the input of the operation command is not limited to the one performed by a tap or the like with respect to the instruction input unit displayed in advance; for example, a command indicating an operation command may be input by operating the input screen displayed on the display unit 12f. Furthermore, input of the operation command is not limited to one using the display unit 12f, and for example, a device such as a sensor mounted on the smartphone constituting the second terminal 12 can be used. The current smartphone incorporates the ability to detect the orientation and position of the smartphone from the output of the built-in 10-axis sensor. Therefore, in FIG. 8(c), rotation in the pan direction, the tilt direction, and the roll direction of the second terminal 12 indicated by a double arrow is used as an operation command. Then, for example, in the case of a camera pan head to be mounted on a rover type robot, rotation in the pan direction, tilt direction, and roll direction of the second terminal 12 is assigned to the operation of the camera pan head. Then, when User B pans the second terminal 12, its rotation direction and angle are sent to the first terminal 11, and the camera pan head is also panned by the same angle. As a result, User B turns the second terminal 12 in a desired direction while watching the live video displayed on the display unit 12f of the second terminal 12, so that the camera platform 11 moves so that the first terminal 11 also faces in the same direction. Since the inclination of the second terminal 12 is directly reflected in the inclination of the robot's head, User B who saw the live image has a good understanding of where the robot 1 is.

[Identification of Motor Module Subject to Function Assignment]

In the above-described embodiments, a user provisionally operates in order to visually confirm that the motor module 10 performs the assigned functions. The present invention is not limited to the one in which the assigned functions are notified based on the motion of the motor module, and can instead be realized by various methods. Various kinds are exemplified below.

Second Embodiment of Motor Module (Notification Using Light)

Figure 9:
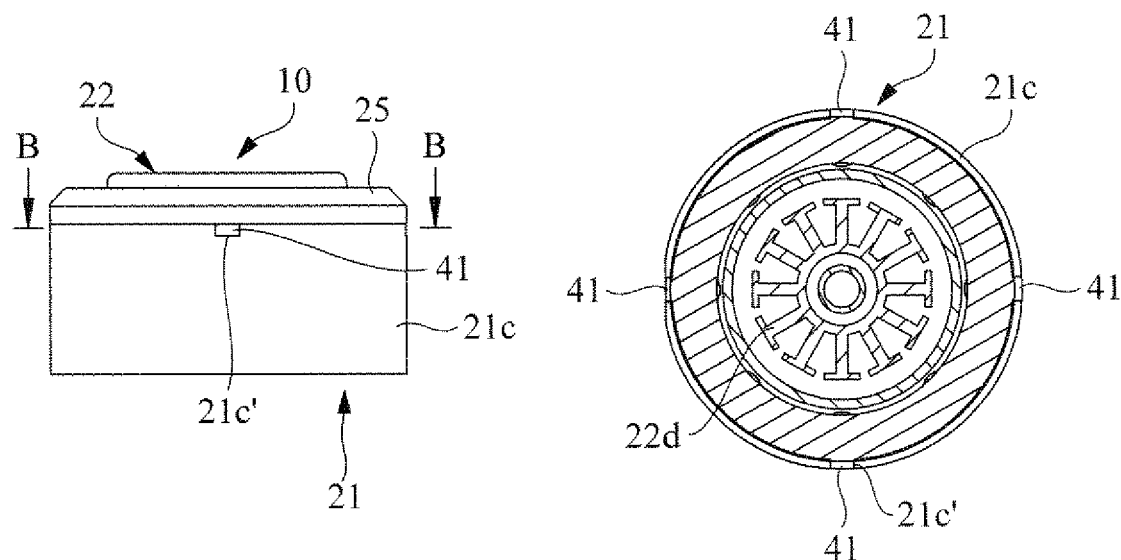
FIG. 9 is a diagram showing a second embodiment of a motor module.

FIG. 9 shows a second embodiment of a motor module. As shown in FIG. 9, the motor module 10 has cutout portions 21c' at an interval of 90 degrees in the circumferential direction on the upper end edge of the outer peripheral wall 21c of the case 21. The cutout portions 21c' are concave portions which open at the upper end edge and penetrates in the thickness direction. Light emitting elements 41 such as LEDs are disposed in the cutout portions 21c'. The light emitting elements 41 receives electric power from the battery and emit light. If the control unit 10c mounted in the motor module 10 receives a notification to assign a function from the first terminal 11, the control unit 10c turns on or blinks the light emitting elements 41. By visually confirming the lighting or blinking of the light emitting elements 41, User A can easily and remotely confirm the motor module to which the function has been assigned.

In the present embodiment, since the light emitting elements 41 are arranged at intervals of 90 degrees in the circumferential direction, confirmation of the light emitting state of the light emitting elements 41 is able to be done irrespective of the position and orientation of the motor modules 10 when building a robot.

The timing at which the light emitting element 41 emits light may be performed either or both of when the function is provisionally set and when the function is actually set. In addition, light emission may continue after being preliminarily set until the function is actually set. Since the light emission of the light emitting elements 41 is a static operation, even if light emission continues, the influence on the robot is small, and in particular, when configured with the LED, the power consumption is small. Therefore, if light emission continues, it is preferable because which motor module is currently being set with a function does not become unknown in the middle.

In the present embodiment, the number of the light emitting elements 41 is set to four, but the number of installed light emitting elements 41 is arbitrary, and may be one or more than one. The larger the number of installed elements, the more preferable it is for the user to visually recognize, but too many will cost more. Therefore, it is preferable to set the number of light emitting elements to, for example, about 2 to 5 elements.

In this embodiment, since the configuration including the light emitting element is the same as the above-described embodiment and the modified example, the detailed description thereof will be omitted.

First Modification of the Second Embodiment

In the second embodiment shown in FIG. 9, light emission from the light emitting elements 41 are outwardly emitted in the normal manner. As a result, the point of light emission becomes the place where the light emitting element 41 is installed, and the light emitting region of each place is small. Therefore, especially when the number of the light emitting elements 41 to be installed is small, a user may not be able to visually recognize the light emission.

Figure 10:
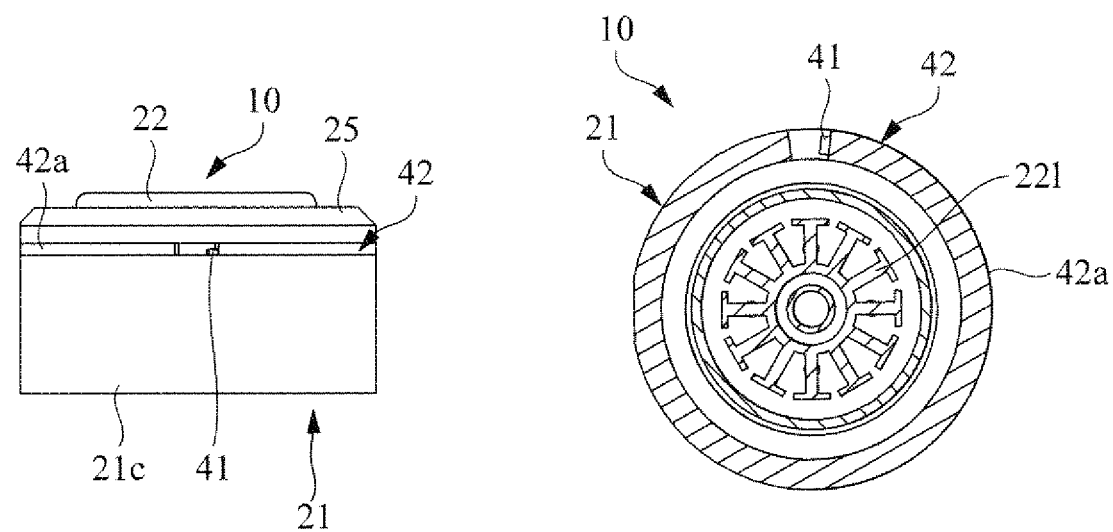
FIG. 10 is a diagram showing a first modified example.

FIG. 10 is intended to solve this problem, and the light emitting region is widened. Specifically, a light-guiding plate (liner) 42 made of acrylic resin or the like is arranged over substantially the entire circumference at the upper edge of the outer peripheral wall 21c of the case 21. The light-guiding plate 42 has a planar shape which is annular and partially cut, and a light emitting element 41 is disposed in the cut portion. A light emitting element 41 such as an LED element is used. Light emitted from the light emitting element 41 is injected into the light-guiding plate 42 from one end surface of the light-guiding plate 42 and travels in the light-guiding plate 42. As a result, light is emitted uniformly outward from the outer side surface 42a of the light guide plate 42. Therefore, it is preferable to use one light emitting element, because a user can confirm the light emission irrespective of the position/orientation of the motor module 10.

Since the other configurations, operations and effects are the same as those of the above-described embodiments and modifications, the detailed description thereof will be omitted.

Second Modification of the Second Embodiment

Figure 11:
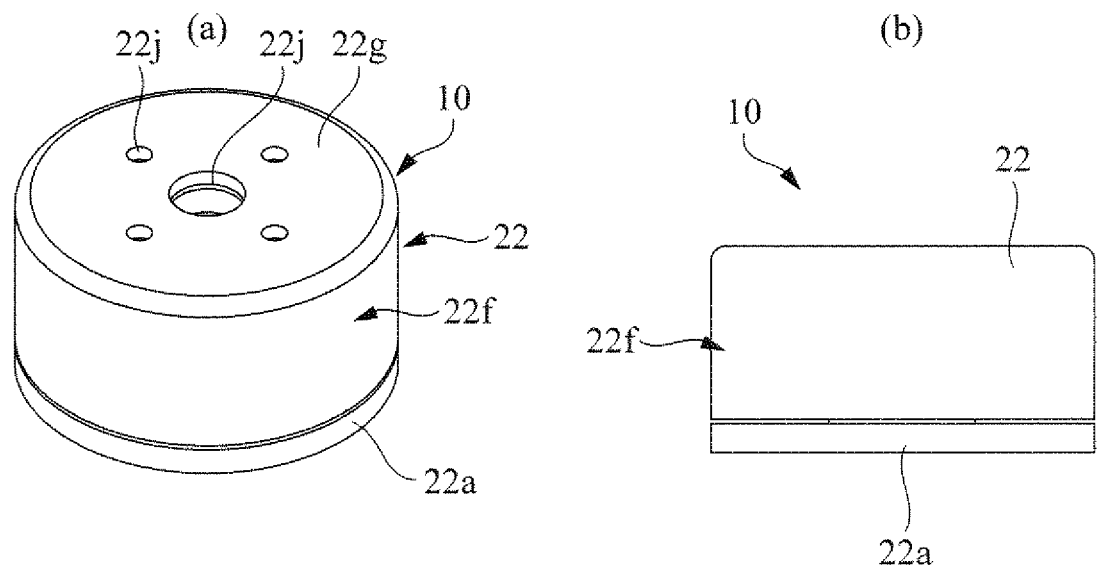
FIG. 11 is a diagram showing a second modified example.

FIG. 11 shows still another modification of the second embodiment. In this modified example, for example, if the stator 22a and the rotor 22f of the motor main body 22 are exposed, a light emitting element is arranged inside the motor main body 22 so as to emit light through the gap between the stator 22a and the rotor 22f. Since the other configurations, operations and effects are the same as those of the above-described embodiment and modifications, the detailed description thereof will be omitted.

Third Modification of the Second Embodiment

The light emitting element 41 used in the embodiment and the modifications described above is configured using a full color LED. Then, each light emitting element 41 provided in each of the plurality of motor modules constituting the robot is controlled so as to emit lights of mutually different colors (see FIG. 17 (a)). When controlling, for example, the first terminal 11 communicates with the surrounding motor modules 10 and acquires specifying information specifying the motor module 10 of the communicating partner. Then, the first terminal 11 notifies the control unit 10c of the emission color for each motor module 10 by sending specific information for each motor module 10. The control unit 10c of each motor module 10 emits light via the light emitting element 41 using the designated emission color.

As shown in FIG. 17(b), for example, the setting function 11b of the first terminal 11 is configured such that each motor module listed in the "motor module catalogue list display screen" (setting screen) displays information on the notified emission color. In the figure, although it is displayed as characters, various display modes can be taken, such as displaying the actual color marks instead of letters/characters, or changing the background color to the notified color, for example.

A user can easily identify the motor module to which the function is to be set based on the light emission color of the actual motor robot and since it is possible to understand the functions to be set, it is possible to easily and appropriately assign the functions.

FIG. 17(c) shows another display example of "motor module catalogue list display screen" which is a setting screen for setting functions. In this example, it is expressed by using figures, making it easy for the user to intuitively understand. The setting function 11b displays a schematic diagram of a robot function setting on the main display unit R1. The setting function 11b displays an arrow-shaped robot designation button B4 below the main display R1. If it detects that the arrow portion of the robot designation button B4 is tapped, the setting function 11b displays a schematic diagram (Function Diagram) of another robot. In this way, function assignment is determined for the robot to be executed. Also, in the schematic diagram of the robot, the function setting mark M is displayed close to the motor module.

Further, the motor module list display section R2 is displayed on the left side of the main display section R1. In the motor module list display section R2, a record number identifying a motor module and a display color are displayed in association with each other. If a function is not set, it is blank.

Then, when the function setting mark M displayed on the main display unit R1 is tapped, the color of the function setting mark M changes. The setting function 11b changes color each time it is tapped. The setting function 11b informs each motor module about the light emission color, and stores the record number and the light emission color associated with each. Therefore, each time the tap is detected, the notified emission colors are displayed in the appropriate order. Then, the color of the function setting mark M is set to the actual emission color of the motor module. Also, the color of the mark of the record number to which the emission color is assigned is displayed in the emission color. By performing a drag operation (tapping and sliding without releasing the finger) between each line of the motor module list display section R2 and the function setting mark M, the mark color of the record number and the color of the function setting mark M in the actual emission color of the motor module is displayed and functions may be set.

As a result, the setting function 11b knows where the motor module of a specific record number exists in the robot. Therefore, the setting function 11b decides the function to be set from the position in the robot, and sets the determined function for the motor module to be set. The user can easily allocate the function by seeing the actual robot and adjusting the emission color of the corresponding motor module.

In the above-described modification, a full color LED is used as the light emitting element to display different display colors, but the present invention is not limited to this, and instead a plurality of different single color LEDs may be prepared and installed. In addition, light emitting elements that emits different colors with one element is not limited to full color, and may have only about 2 to 5 colors.

Third Embodiment of Motor Module

Figure 12:
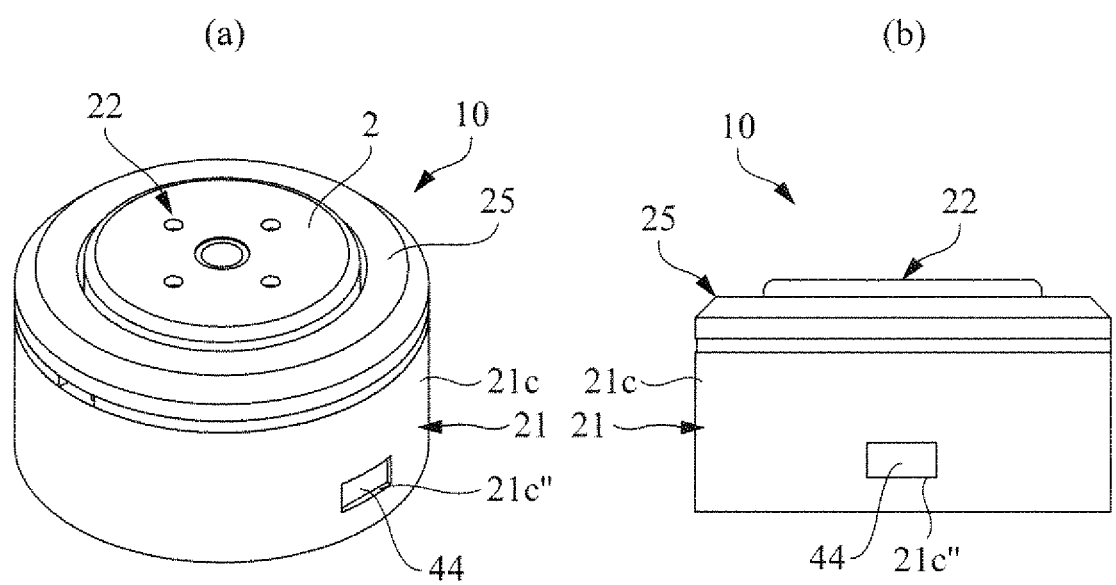
FIG. 12 is a diagram showing a third embodiment of a motor module.

FIG. 12 shows a third embodiment of a motor module. In the embodiments described above, the designation of the motor module for which the function is to be set is determined based on commands from the first terminal 11 side, but in the present embodiment, it is determined based on the transmission from the motor module 10 side.

In order to realize this function, in the present embodiment, a window hole 21c" is formed in the side surface of the outer peripheral wall 21c of the case 21 of the motor module 10. A push-button switch 44 is placed in the window hole 21c". If this push-button switch 44 is pressed, the control unit 10c of the motor module 10 enters a mode in which functions become set.

For example, if the push-button switch 44 is pressed, the control unit 10c communicates with the first terminal 11 and issues instructions to assign functions. When the setting function 11b of the first terminal 11 receives an instruction request for assigning the function, it displays the "motor module function assignment screen" shown in FIG. 7(c). If the screen is already being displayed, the setting function 11b does not change the screen. By tapping the desired function name from among the function names listed in the displayed "motor module function assignment screen", a user sets a function of the push-button switch 44 for the pushed motor module 10. Since the function setting algorithm based on the tap of "function module assignment screen of motor module" is as described above, its explanation will be omitted. Pressing this push-button switch 44, for example, from the catalog list displayed on the "motor module catalog list display screen" shown in FIG. 7(b), it can be said that it has the same function as tapping the "function" part of the motor module to be set from the designation button.

Further, pressing of the push-button switch 44 is not limited to being assigned as a trigger for performing the above-described function setting; for example, the following functions may be assigned. One example, on the first terminal 11 side, the functions of each motor module necessary to configure the robot are listed in advance. Another example, if it is a car robot (two wheels), the function for the right wheel and the function for the left wheel are listed. When the first terminal 11 connects with each of the surrounding motor modules and assigns functions one by one, on the first terminal 11 side, the function to be set this time is automatically or manually selected, and the push button switch 44 of the motor module that sets its function is pressed. Then, the push-button switch 44 sets the selected function for the pressed motor module, Since the other configurations, operations and effects are the same as those of the above-described embodiment and modifications, the detailed description thereof will be omitted.

Modified Example of the Third Embodiment

In the third embodiment, a push-button switch 44 is provided in order to set a function based on a call from the motor module 10 side. The present invention is not limited to this, and various switches such as a mechanical type, an electric type and the like can be used.

Also, instead of separately providing such a switch for setting, instead, for example, detecting the counter electromotive force of the produced motor by rotating the motor body by hand, or alternatively, by detecting the movement with the rotary encoder, functions may be allocated. By doing so, there is no need to provide a separate device like a switch, which is preferable because the structure can be simplified.

[Improvement of Function Assignment to Multiple Motor Groups]

In each of the above-described embodiments, User A, who sets the functions, operates the first terminal 11 or the motor module 10 to assign the function. In the following embodiments, a system for efficiently assigning functions will be described.

System in which the Motor to be Set Automatically Switches

Figure 13:
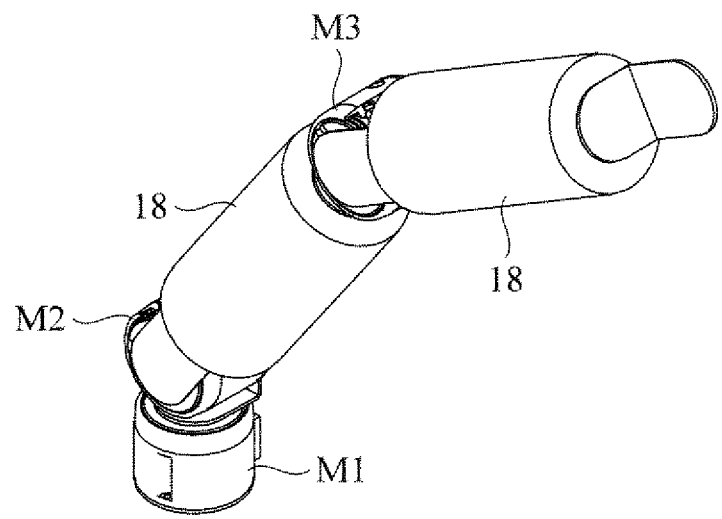
FIG. 13 is a diagram for explaining an example of a system in which the motor to be set automatically switches.

After making the first terminal 11 communicable with the surrounding motor modules 10 manually or automatically, when assigning functions one by one, in order to be able to determine which motor module is the target to be set at this time, the motor modules are rotated sequentially. For example, it is advisable to rotate in increments of 5 degrees each time. That is, for example, if the robot 1 to be set is an arm type robot like that shown in FIG. 13, three motor modules 10 and two cylindrical blocks 18 are provided. For convenience, it is assumed that the first motor M1, the second motor M2, and the third motor M3 are arranged in order from the bottom. Then, when only the first motor M1 rotates, the two cylindrical blocks 18 make a sweeping motion. On the other hand, when only the second motor M2 rotates, the two cylindrical blocks 18 tilt. Furthermore, when only the third motor M3 rotates, only the cylindrical block 18 at the end moves. In particular, as the first motor M1 and the second motor M2 rotate, the two cylindrical blocks 18 move integrally while maintaining their relative positional relationship, even if the rotation angle of the motor module 10 is small, the overall motion becomes large, and a user can easily recognize the state of motion. Moreover, without looking at the direction of the overall motion of the two cylindrical blocks 18, by watching whether the position of the end moves in the vertical direction or the horizontal direction, it can be understood whether the first motor M1 or the second motor M2 is moving.

While the motor is rotating, the setting function 11b displays the "motor module function assignment screen" shown in FIG. 7(c) on the display unit. Then, from among the function names listed in "motor module function assignment screen" displayed and selected by a tap, the setting function 11b assigns the function to the rotating motor.

By doing like this, it is possible to sequentially assign functions to the motor. Then, intuitively assigning functions sequentially becomes possible, and quickly setting robot function assignments becomes possible.

System that Automatically Assigns Functions

In the present embodiment, if the smartphone 19 is incorporated in the robot 1, rotation of the motor modules is detected using sensors built into the smartphone 19 so that the function is assigned. For example, if the motor module 10 which is a part of the robot holds the smartphone 19 as shown in FIG. 14 (sideways), then the rotation angle of the smartphone 19 in the pitch direction when the motor module 10 rotates by 180 degrees is about 180 degrees.

Then, for example, the direction of the smartphone 19 can be known from the output value of the acceleration sensor, and the amount of rotation around each axis can be known from the angular velocity value of the gyro sensor and the like. Therefore, for example, from the sensor output when the motor module 10 shown in FIG. 14 is rotated by 180 degrees, if it can be detected that it has rotated by 180 degrees about the Y axis, then the rotated motor module moves the smartphone in the pitch direction and sets the function as one for performing the rotation operation. For example, if the camera pan head robot is used, the function for the yaw direction is set for the motor module concerned.

Figure 14:
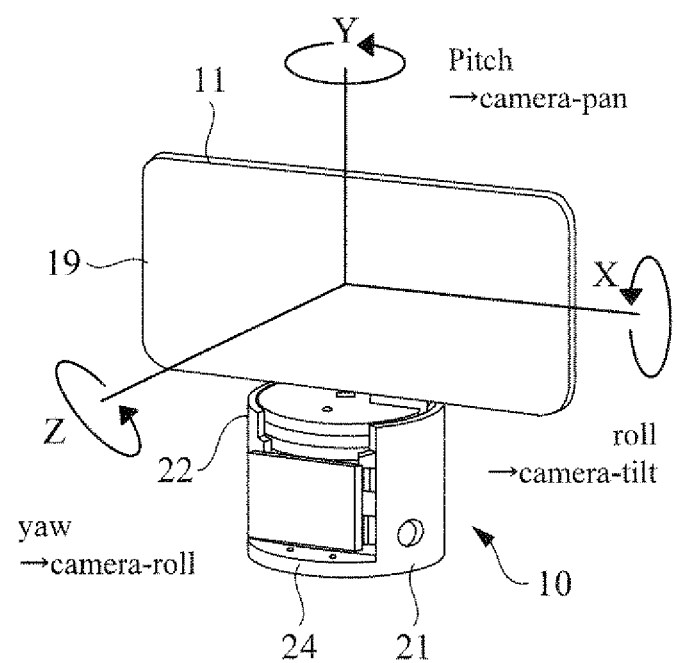
FIG. 14 is a diagram illustrating an example of a system that automatically assigns functions.

In FIG. 14, since the smartphone 19 is directly connected to the output unit of the motor module 10 while standing horizontally, as the motor module 10 rotates, it moves in the pitch direction, but by connecting the motor module 10 and the smartphone 19 via a plate and other mechanical elements, the rotation direction of the smartphone 19 changes with the rotation of the motor module 10. Therefore, the function of the motor module can be specified by the orientation of the smartphone 19 (the value of the acceleration sensor) and the amount of rotation about each axis (the angular velocity value of the gyro sensor etc.), and it is possible to automatically set the functions. For example, the determination conditions for automatically determining the pan direction, tilt direction, and roll direction function in the camera pan head are as shown in the following table.

Therefore, the setting function 11b of the first terminal 11 sequentially issues an operation command to the communicable motor module 10 one by one, acquires the built-in sensor output value of the smartphone 19 as the motor module 10 rotates, determines the function to be set, and performs the function assignment. As a result, it is possible to automatically assign functions to all or part of the motor modules constituting the robot.

Also, the smartphone 19 installed in robot 1 may be the first terminal 11 or another one. If both are different, then the first terminal 11 and the smartphone 19 acquire the sensor output values from the smartphone 19 using various communication functions, and set the functions for motor modules 10. If they are the same, then the setting function 11b of the first terminal 11 assigns functions to the motor modules sequentially by using the output value of the sensors implemented in the first terminal.

In the above-described embodiment, an example in which a smartphone is incorporated in a robot has been described, but the present invention is not limited to this, a board to which sensors are connected may be incorporated and the output values of the sensors may be acquired by the first terminal enabling assignment of the functions.

TABLE 1

| No. | Condition 1 (Terminal Orientation: Accelerometer) | Condition 2 (Rotation Amount: Gyro Sensors) | Function Determination Results |
|---|---|---|---|
| 1 | Acceleration in the y direction <−0.75 | Pitch Variation >150° | Camera Panhead Pan Direction |
| 2 | (Terminal Landscape 1) | Roll Variation >150° | Camera Panhead Tilt Direction |
| 3 | | Yaw Variation >150° | Camera Panhead Yaw Direction |
| 4 | Acceleration in the y direction >0.75 | Pitch Variation >150° | Camera Panhead Pan Direction (Reverse Direction) |
| 5 | (Terminal Landscape 2) | Roll Variation >150° | Camera Panhead Tilt Direction (Reverse Direction) |
| 6 | | Yaw Variation >150° | Camera Panhead Yaw Direction |
| 7 | Acceleration in the y direction <−0.75 | Pitch Variation >150° | Camera Panhead Tilt Direction |
| 8 | (Terminal Landscape 1) | Roll Variation >150° | Camera Panhead Pan Direction |
| 9 | | Yaw Variation >150° | Camera Panhead Yaw Direction |
| 10 | Acceleration in the y direction >0.75 | Pitch Variation >150° | Camera Panhead Tilt Direction (Reverse Direction) |
| 11 | (Terminal Landscape 2) | Roll Variation >150° | Camera Panhead Pan Direction (Reverse Direction) |
| 12 | | Yaw Variation >150° | Camera Panhead Yaw Direction |

Automatic Setting Using Photographing Device

Although a specific illustration is omitted, as another system that automatically assigns functions, image recognition and automatic function assignment may be performed depending on the form of the robot; for example, with respect to an image obtained by photographing a robot with the camera 11h of the first terminal 11.

Specifically, first, the setting function 11b of the first terminal 11 determines the spatial coordinates (x, y, z) of each of the motor modules and the axial directions of the modules based on the images of the robot captured by the camera. The setting function specifies the motor modules in the spatial coordinate system recognized by itself, and recognizes which of the unique identifiers the motor modules actually have. In this recognition process, if light emitting elements have been mounted, for example, as shown in the second embodiment of the motor modules, the setting function turns on the light emitting elements one by one in order of the motor modules, and after identifying the emitting motor modules, it is possible to recognize which module in the space coordinate system is trying to allocate the function. After identifying the positional relationships of all the modules based on the position of the camera or the like, a function is automatically selected using a discriminant formula.

Also, the recognition processing is not limited to using the above-described light emitting elements, but it may be determined by using the movement and displacement of the robot at that time; for example, in actual operation, motor modules are sequentially operated one by one. Also, the first terminal 11 that does the setting may be integrated with robot, or User A may carry a portable configuration separate from the robot.

Furthermore, in order to improve the accuracy of image recognition, using a stereo camera or taking pictures from a plurality of angles is advisable.

Since other configurations and operational effects are the same as those of the above-described embodiments and modified examples, a detailed description thereof will be omitted.

[Setting from a Remote Location]

In each of the embodiments described above, functions are assigned to each motor module 10 by operating the first terminal 11, but, for example, it may be performed from a remote place via the second terminal 12 connected through the internet. For example, using the camera 11h of the first terminal 11, the robot along with the motor modules is photographed and streamed in real time. The second terminal 12 communicates with the first terminal 11 using the internet communication function, and outputs the delivered video image to the display unit. The user operating the second terminal 12 assigns functions using the various methods described above while checking the video image. The assigned functions should be set with the control units 10c of the motor modules 10 via the first terminal 11.

[Reuse of Stored Functions by First Terminal and Motor Modules]

In each of the embodiments and the modifications described above, when assigning functions to the motor modules, the functions of all of the motor modules 10 and the first terminal 11 are stored in nonvolatile memory. As a result, even if the motor module is temporarily turned off, when the power of each motor module is turned back on, the control unit 10c operates according to the stored function in the storage unit 10g, and the assembled robot is activated the same as the last time.

Also, the storage unit 11i of the first terminal 11 stores the set functions together with the specifying information specifying each motor module in association with each other. Here, since the specific information uniquely identifies a motor module, for example, when communicating from the motor module to the terminal, using a unique ID identifier included in the packet as a key is preferable. As an example of the unique ID identifier, UUID (Universally Unique Identifier) or the like may be used. In this way, for example, if the motor module's set functions are not stored, then when restarting the robot, the information stored by the first terminal 11 is called up and each motor module constituting the robot is set.

Figure 17:
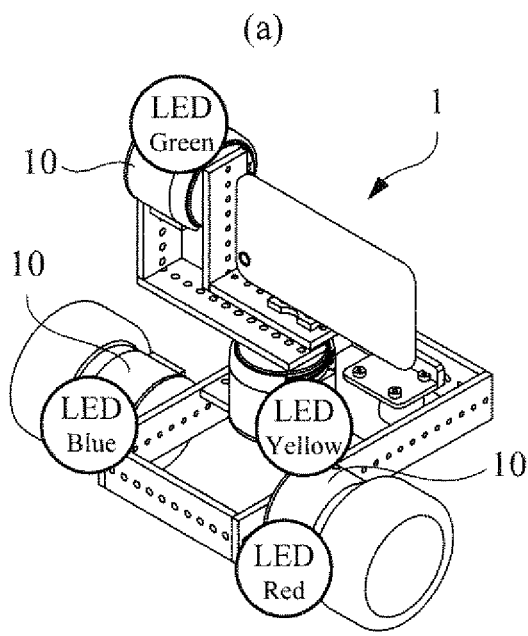
FIG. 17 is a diagram for explaining a robot reassembly function.

Even when the robot is disassembled, the storage unit 10g of each motor module 10 stores the set function and the emission color. Therefore, when the motor module 10 of the previously assembled robot is turned on, each motor module 10 emits light from the emitting element(s) 41 with each stored color. On the other hand, when the robot is reassembled, the first terminal 11 can display the arrangement information of the mounting positions of each motor module in the robot based on the information stored in the storage unit 11i. For example, as shown in FIG. 17 (d), the setting function 11b displays a Function Diagram representing an assembled robot. At this time, each motor module is illustrated so that the color of the light emitting element(s) can be known. At this time, each motor module is illustrated so that the color of the light emitting element(s) can be ascertained. This Function Diagram is an assembly drawing for assembling a robot. While looking at the screen of the first terminal 11, a user attaches the motor module emitting the same color that corresponds to the same position of the robot. As a result, the user can intuitively assemble the robot, thereby saving the trouble of assigning the functions again. Therefore, after assembly, the stored functions are activated, and the same robot as before disassembly can be configured.

[Configuration in which a Motor Module does not Hold an Assigned Function]

In each of the embodiments and the modifications described above, when a function is assigned to a motor module, each function is stored in the nonvolatile memory in both the motor module 10 and the first terminal 11, but the present invention is not limited to this, and the assigned functions may also be stored in the volatile memory. If done this way, the set functions are cleared when the power is off. Therefore, when the power is tuned back on, functions should be reassigned.

Such a configuration is particularly preferable when used under the following conditions. Namely, for example, when prototyping a robot or creating a robot needed for a temporary use, then disassembling the assembled robot after using robot and returning the individual motor modules to their original state. The disassembled individual motor modules may then be used for another robot application. In such a system, functions are assigned to the motor module every time a robot is created. In order to prevent erroneous operation, clearing the assigned functions when the power is turned off is preferable.

Example Using Motor Modules as Input Devices

In the embodiments described above, the rotary encoder 26 is mounted on the motor module 10. Therefore, the motor modules can be used as input devices. That is, when the rotor 22f of the motor main body 22 is rotated manually or the like, the upper part of the rotation can be detected by the rotary encoder 26. Therefore, the motor module 10 can be used as an input device (controller) for parameters such as angular position and angular velocity in addition to the rotation of the rotor 22f.

Thus, from one motor module, for example, a different motor module can be moved either directly or via a terminal. If multiple robots are assembled, then when one robot is moved manually, it is also possible to cause another robot to make the same movement (master slave control), to memorize the operation of the robot, and to reproduce the operation from the terminal side (teaching function). These operations are effective for controlling a plurality of robot devices by wirelessly controlling the motor modules and driving them with batteries.

FIG. 15(a) shows an example of a robot using motor modules as input devices. In this example, a car robot is configured using six motor modules. A handle 50 is connected to the output unit of the first motor module 10 (1), and an accelerator 51 is connected to the output unit of the second motor module 10 (2). Further, a left front wheel (not shown) is connected to the output unit of the third motor module 10 (3). The right front wheel (not shown) is connected to the output unit of the fourth motor module 10 (4). The left rear wheel (not shown) is connected to the output unit of the fifth motor module 10 (5), and the right rear wheel (not shown) is connected to the output unit of the sixth motor module 10 (6). Each motor module is connected to the frame 15 either directly or via another mechanical element.

The first motor module 10(1) and the second motor module 10(2) are used as input devices. That is, when the handle 50 is rotated to the right or to the left, the output unit of the first motor module 10(1) also rotates, and the rotation is detected by the rotary encoder 26, which then controls the four motor modules driving the four wheels (assisting operation). The affected control turns to the right or left, for example by the rotation speed difference of each motor module, or makes the speed equal and makes it go straight. Further, when pressing the accelerator 51, the output unit of the second motor module 10 rotates, so that the increase/decrease of the rotation speed of the four motor modules is controlled based on the rotation angle.

Furthermore, use as an input device of the second motor module 10 (2) is not limited to the control of the moving speed of the car robot, controlling a returning operation or the like, such as for example when the load pressing on the accelerator 51 is released, and the rotation is returned to the original pedal position based on the rotation angle at that time may be used.

Application Example of a Robot

Robots constructed using the motor module system of the present invention are not limited to the ones exemplified above and can be applied to various kinds. As a practical example, it can be used as a service robot. Specific examples include transport robots, customer robots, inspection robots, cleaning robots, nursing care/welfare robots, communication robots, disaster response robots etc.

Figure 16:
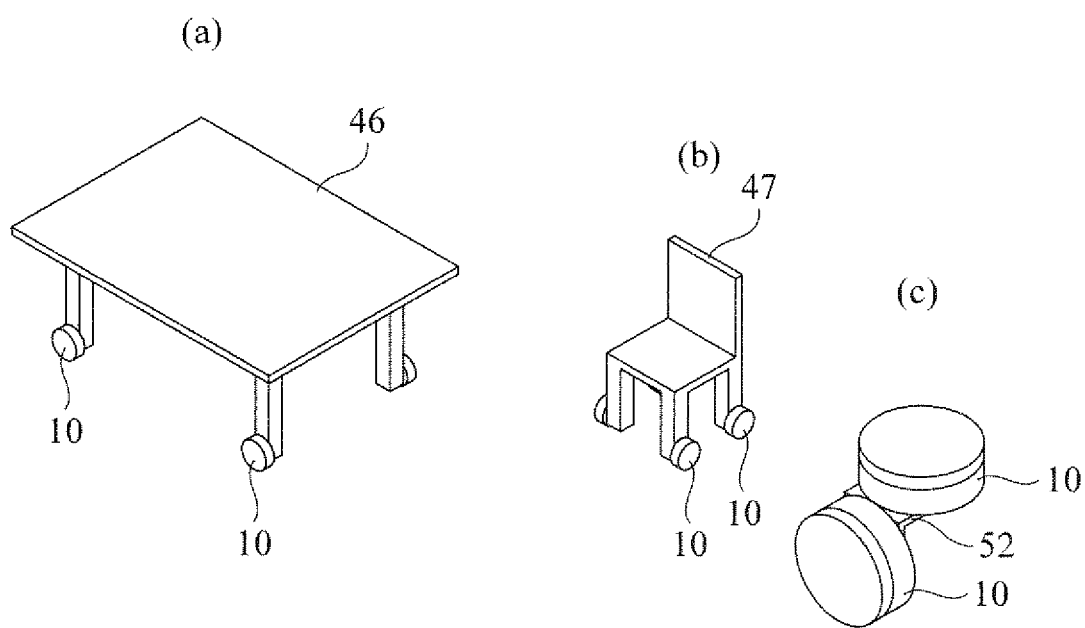
FIG. 16 is a diagram showing an example of being applied to another robot.

Furthermore, it can be attached to and used with existing articles. For example, as shown in FIG. 16(a) by attaching motor modules 10 to the legs of a desk 46, the combination can be used as a transport robot. Further, as shown in FIG. 16 (b), if the motor modules 10 are attached to the leg of a chair 47, it can be used for personal mobility (moving means). Since these can be attached to a plurality of furniture and controlled from one control terminal simultaneously, through simple operation, the placement of furniture can be dynamically changed. Further, as shown in FIG. 16 (c), if the axes of the two motor modules 10 are arranged orthogonal to each other using an L-shaped plate 52, a robot movable in all directions can be created.

[System without a Separate Terminal Such as a Smartphone During Robot Operation]

In the above-described embodiments and modifications, a command is sent to a motor module from the first terminal 11, or possibly the second terminal 12, having the operation control function, and although the operation of the motor module is controlled, realizing a robot without using the first terminal etc., is also possible.

That is, for example, the first terminal 11 or the like is used to assign functions to the motor modules. After that, the motor modules move according to the assigned functions without receiving instructions from the terminal.

Figure 15:
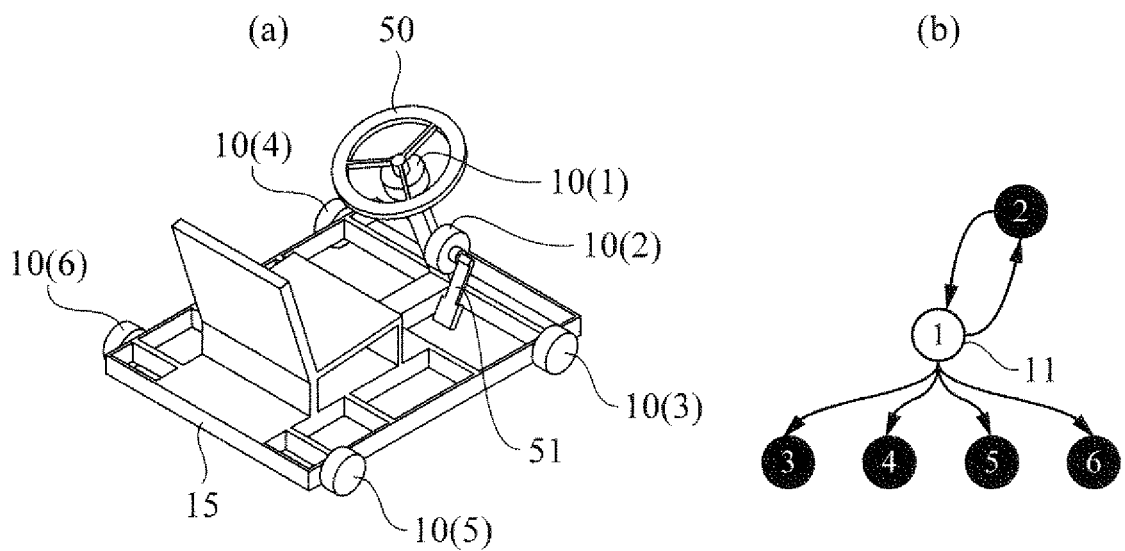
FIG. 15 is a diagram showing an embodiment in which a motor module system is used as an input device.

Also, if a robot equipped with motor modules that operate as input devices, such as the robot shown in FIG. 15, then the control unit of at least one motor module is used for calculating the input and output to and from either itself or possibly another motor module.

The above-described embodiments and modifications may be combined as appropriate. Also, when combining, adapting a portion of the structure and combining it with other forms may be preferable. Further, another invention requiring a portion of the structure shown in the embodiments and modifications of the figures may be constituted.

Although the various aspects of the present invention have been described using embodiments and modifications, these embodiments and explanations are not intended to limit the scope of the present invention, but rather should be noted that they were provided to contribute to the understanding of the present invention. The scope of the present invention is not limited to the configurations and manufacturing methods explicitly described in the specification but also includes combinations of various aspects of the present invention disclosed in this specification. Among the present inventions, the configurations to be patented are specified in the scope of the appended claims; however, even if the current process is not specified within the scope of the claims, the configurations disclosed herein may be used as the basis for possible future claims.

DESCRIPTION OF REFERENCE SYMBOLS

1 Robot
10 Motor Module(s)
10a Motor Main Body
10b Communication Function
10c Control Unit
10e Battery
11 First Terminal
11a Wireless Communication Function
11b setting function
11c Operation Control Function
11d Internet Communication Function
12 Second Terminal
13 First L-Shaped Plate (Connecting Member)
14 Second L-Shaped Plate (Connecting Member)
15 Frame (Connecting Member)
18 Cylindrical Block (Connecting Member)
19 Smartphone
22e Shaft
22f Rotor
22g Top Panel
22i Opening
24 Battery
26 Rotary Encoder
30 Deceleration Mechanism Unit
41 Light Emitting Element
44 Push-Button Switch

The invention claimed is:
1. A motor module system comprising:
a plurality of identical modules,
a robot configured by connecting said plurality of motor modules directly or via connecting members, and
a setting terminal,
wherein each motor module includes a motor main body having a rotating output portion, a wireless communication function, a control unit, and a battery,
wherein the wireless communication function, the control unit, and the motor main body are in a same housing,
wherein the setting terminal has a wireless communication function and a setting function for assigning functions to the control unit of each of the plurality of motor modules using the wireless communication function in order to operate said robot, and
wherein the control unit controls the driving of the motor main body based on the function set by the setting function of the setting terminal.

2. The motor module system according to claim 1,
wherein a plurality of types of functions for configuring robots are pre-installed on the setting terminal as those to be set in the motor modules of the configured robot, and for each motor module to be set one function from among the plurality of installed functions is selected, and the function is allocated.

3. The motor module system according to claim 1,
wherein the control unit of each of the motor modules controls the driving of the motor main body of itself based on the function set by the setting terminal.

4. The motor module system according to claim 1,
wherein the rotation information based on the rotation of the motor main body is used as input information and the rotation of the motor body of the motor module itself or another motor module is controlled based on the input information.

5. The motor module system according to claim 1,
wherein the motor module includes a response function for providing notice that a function assigned by the setting terminal has been set.

6. The motor module system according to claim 5,
wherein the response function causes the motor body to rotate in accordance with the notification from the setting terminal.

7. The motor module system according to claim 1,
wherein the setting terminal comprises:
a determination function for determining a function to be set in each motor module, wherein the setting terminal is then able to assign the determined function, and
a notification function for sequentially notifying that a function assigned to each of the plurality of motor modules has been set based on an operation performed by the motor module having received the notification.

8. The motor module system according to claim 7,
wherein a sensor for detecting movement of the robot may be provided, and the determination function may be performed based on output from the sensor associated with the rotation operation, and the operation is the rotational motion of the motor module which is to be set.

9. The motor module system according to claim 1,
wherein a motor module may include a light emitting unit emitting light of different colors, and by using the light emitting color of the light emitting unit, the setting terminal may set the function in the control unit of the motor module to be set.

* * * * *